(12) United States Patent  
Shmueli et al.

(10) Patent No.: US 8,930,407 B2  
(45) Date of Patent: Jan. 6, 2015

(54) INCREMENTAL CLUSTERING OF INDEXED XML DATA

(75) Inventors: Oded Shmueli, Nofit (IL); Lila Shnaiderman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 269 days.

(21) Appl. No.: 13/000,022

(22) PCT Filed: Jun. 18, 2009

(86) PCT No.: PCT/IL2009/000609  
§ 371 (c)(1),  
(2), (4) Date: Dec. 20, 2010

(87) PCT Pub. No.: WO2009/153793  
PCT Pub. Date: Dec. 23, 2009

(65) Prior Publication Data  
US 2011/0099205 A1 Apr. 28, 2011

Related U.S. Application Data

(60) Provisional application No. 61/074,311, filed on Jun. 20, 2008.

(51) Int. Cl.  
*G06F 17/30* (2006.01)

(52) U.S. Cl.  
CPC .... *G06F 17/30923* (2013.01); *G06F 17/30911* (2013.01); *G06F 17/30961* (2013.01)  
USPC ........................................................ 707/797

(58) Field of Classification Search  
USPC ................................................ 707/795–797  
See application file for complete search history.

(56) References Cited

U.S. PATENT DOCUMENTS

| | | | |
|---|---|---|---|
| 6,026,474 A * | 2/2000 | Carter et al. | 711/202 |
| 7,251,663 B1 * | 7/2007 | Smith | 1/1 |
| 7,689,577 B2 | 3/2010 | Thelen | |
| 7,877,722 B2 * | 1/2011 | Duffy et al. | 716/55 |

(Continued)

FOREIGN PATENT DOCUMENTS

WO WO 2009/141818 11/2009

OTHER PUBLICATIONS

International Preliminary Report on Patentability Dated Dec. 2, 2010 From the International Bureau of WIPO Re. Application No. PCT/IL2009/000496.

(Continued)

*Primary Examiner* — Hosain Alam  
*Assistant Examiner* — Navneet K Ahluwalia

(57) ABSTRACT

In a data storage and retrieval system wherein data is stored and retrieved in pages, said data comprising connected nodes arranged such that each page stores only complete nodes, said connected nodes being connected via a plurality of overlapping tree structures, a method of minimizing page retrieval in the face of changing relationships between nodes comprising: selecting at least two of said overlapping tree structures; incrementally adjusting a page node structure dynamically based on real time workload, separately according to each selected tree structure, to form modified partitions for each tree structure, each modified partition being so as to minimize page faults; for each modified partition calculating a modification gain to indicate which partition has provided a greater minimization of page faults; and selecting the tree structure and modified partition corresponding to the best modification gain.

24 Claims, 14 Drawing Sheets

(56) References Cited

U.S. PATENT DOCUMENTS

| | | |
|---|---|---|
| 8,572,085 B2 | 10/2013 | Shmueli et al. |
| 2005/0102256 A1* | 5/2005 | Bordawekar et al. ............. 707/1 |
| 2011/0208737 A1 | 8/2011 | Shmueli et al. |
| 2014/0012851 A1 | 1/2014 | Shmueli et al. |

OTHER PUBLICATIONS

Beyer et al. "System RX: One Part Relational, One Part XML", Proceedings of the 2005 ACM Sigmond International Conference on Management of Data, Baltimore, MD, USA, [Online], XP002547054, p. 347-358, Jun. 14-16, 2005. Retrieved From the Internet on Sep. 23, 2009. p. 347-351.

McIver Jr. et al. "Self-Adaptive, On-Line Reclustering of Complex Object Data", ACM Sigmod Record, [Online], XP002547042, 23(2): 407-418, Jun. 1994. Retrieved From the Internet on Sep. 23, 2009.

Shekhar et al. "CCAM: A Connectivity-Clustered Access Method for Networks and Network Computations", IEEE Translactions on Knowledge and Data Engineering, XP002547026, 9(1): 102-119, Jan.-Feb. 1997. Retrieved From the Internet on Sep. 23, 2009.

Yang "Data Clustering for Automatic Application Replication", Master of Science Thesis, Department of Computer Science Vrije Universiteit, Amsterdam, NL, XP002547060, [Online], p. 1-58, Aug. 2005. Retrieved From the Internet on Sep. 23, 2009. p. 1-29, 46-51.

Official Action Dated Jul. 20, 2012 From the US Patent and Trademark Office Re. U.S. Appl. No. 12/989,664.

Official Action Dated Feb. 27, 2013 From the US Patent and Trademark Office Re. U.S. Appl. No. 12/989,664.

Official Action Dated Sep. 16, 2014 From the US Patent and Trademark Office Re. U.S. Appl. No. 14/024,666.

* cited by examiner

```
<root>
    <a>
        <b> s </b>
        <c> s </c>
    </a>
    <a>
        <b> s </b>
        <c> s </c>
    </a>
</root>
```
The XML document
FIG. 2A
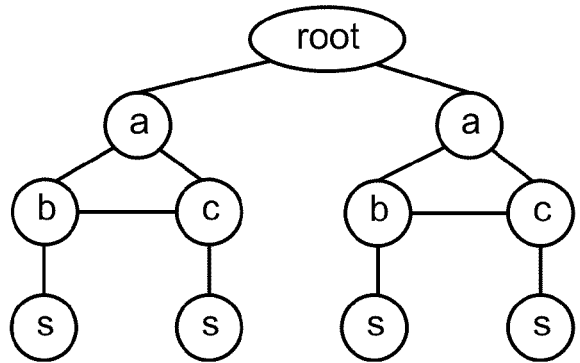
Base augmented tree
FIG. 2B
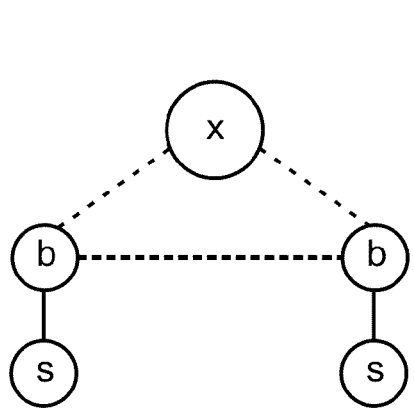
X index augmented tree
FIG. 2C
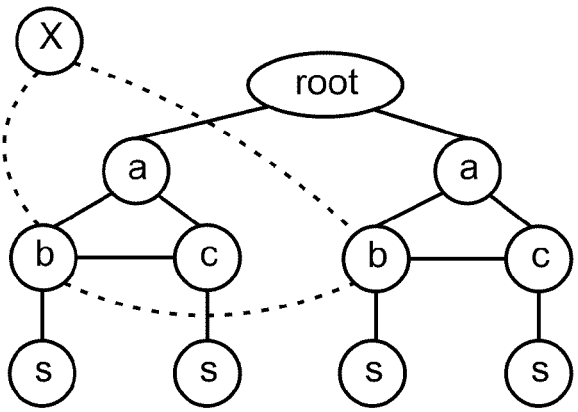
Full graph
FIG. 2D

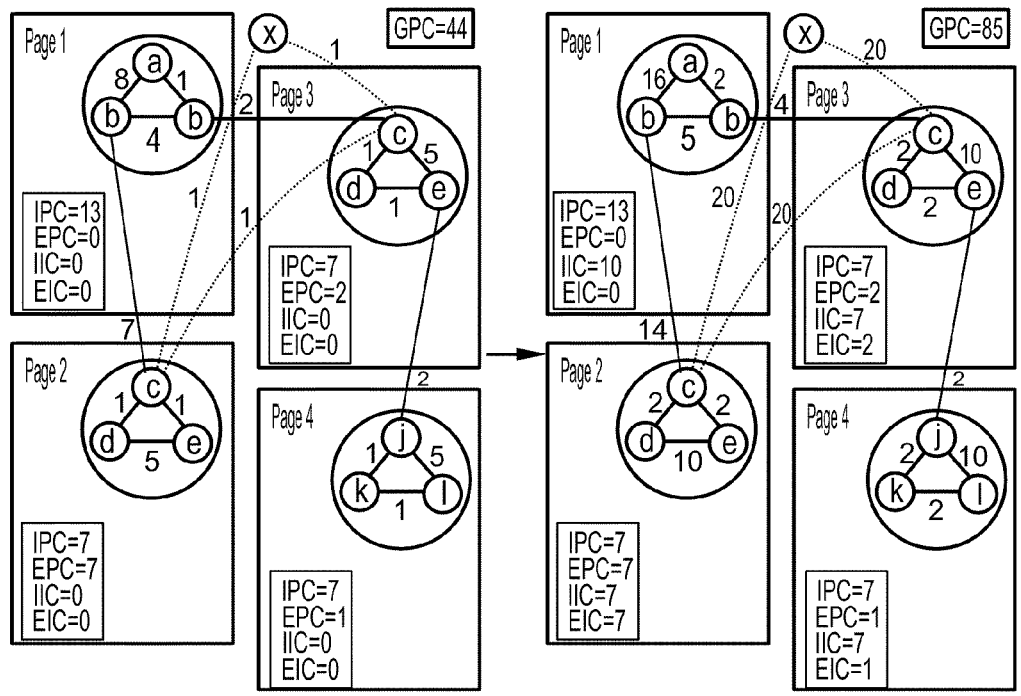
FIG. 7A  Before reclustering (triggering part).
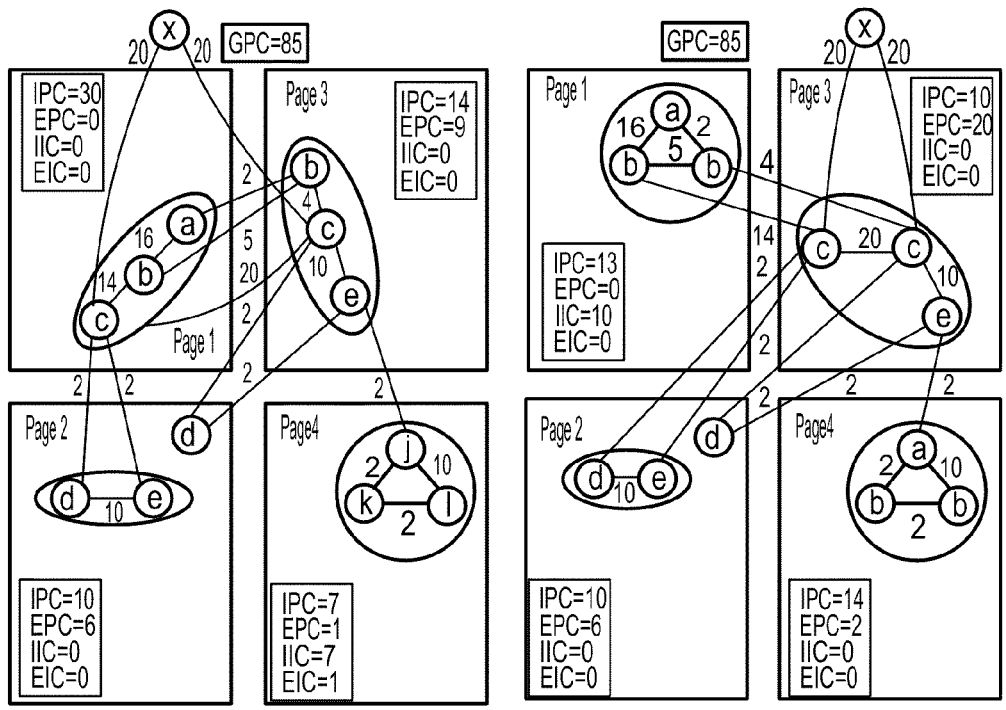
FIG. 7B  After reclustering using the base augmented tree.
FIG. 7C  After reclustering using the X index augmented tree.

Saxon log:

/a/b'/c

-1  *
 0  *
 1  *
 2
 3  *
 4  *
 5

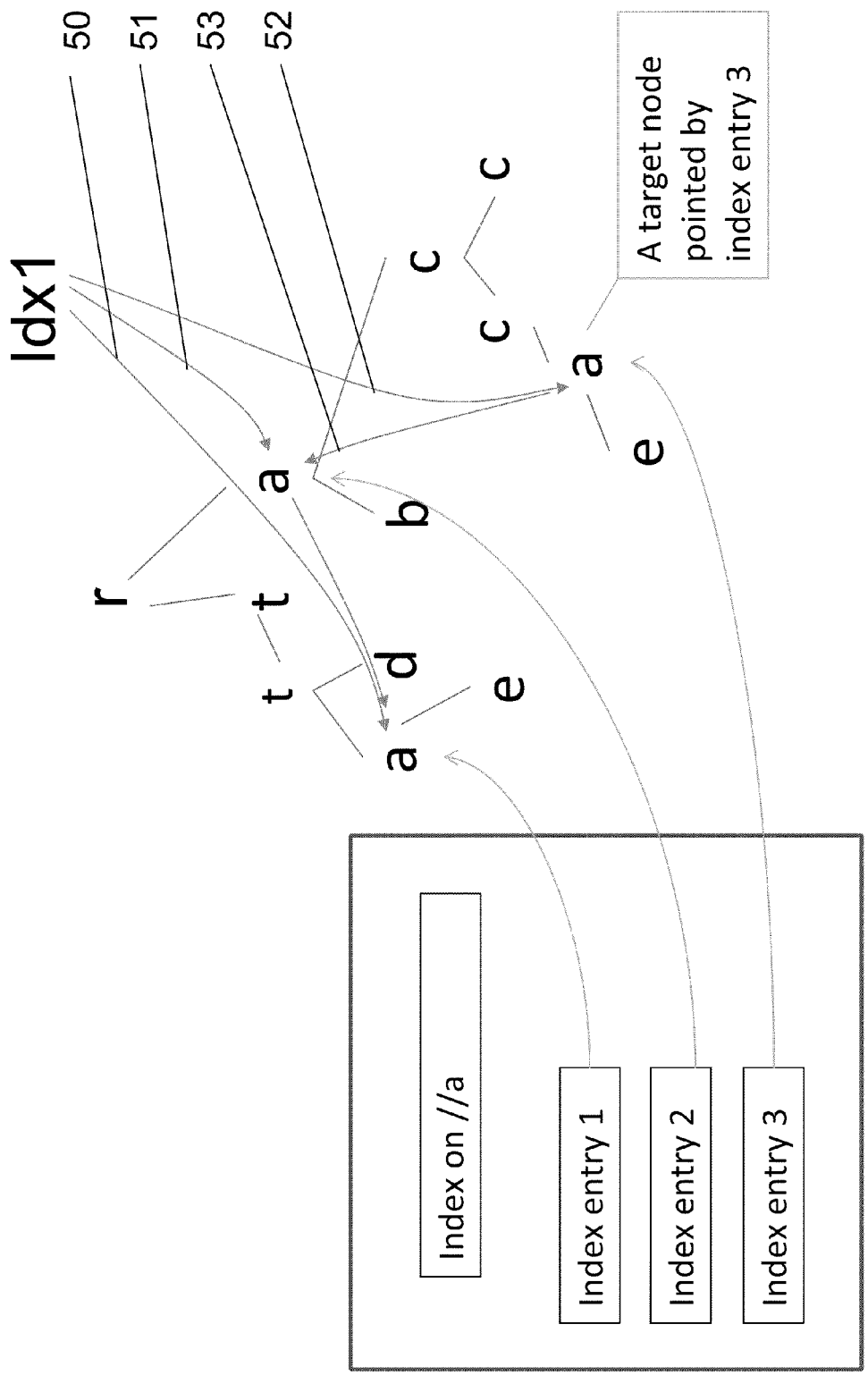
FIG. 12: INDEX EXAMPLE

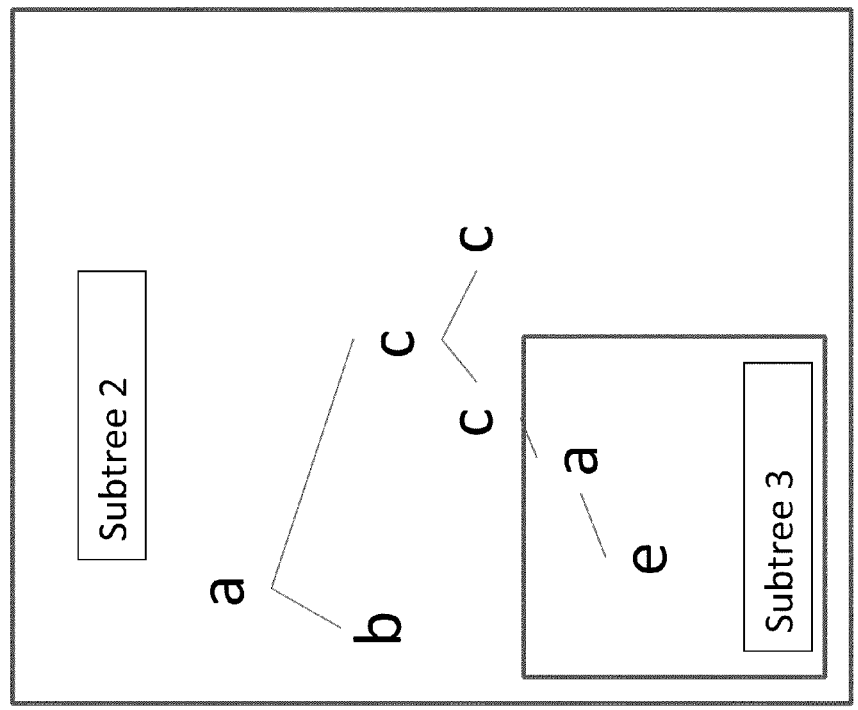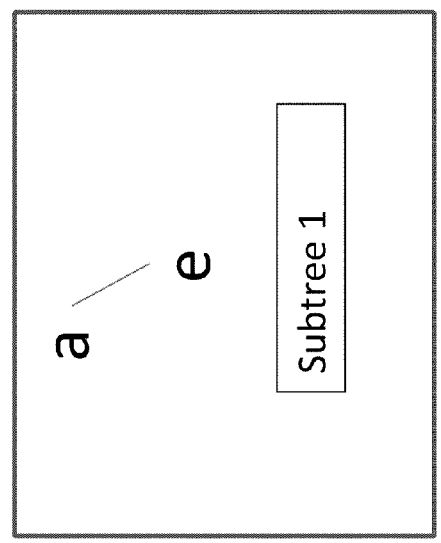
FIG. 13: IMPLIED subtrees

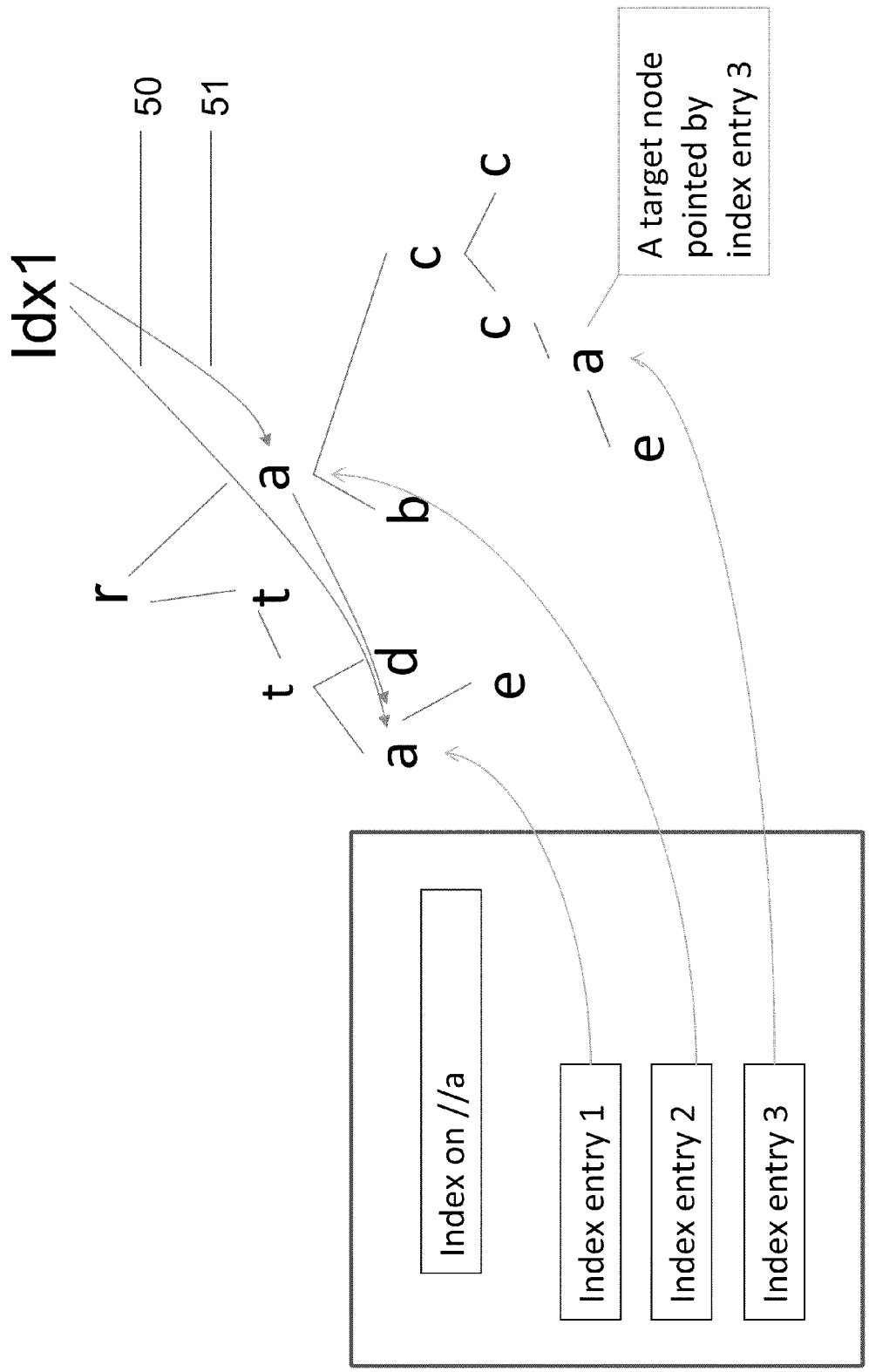
FIG. 14: INDEX EXAMPLE – final tree

INCREMENTAL CLUSTERING OF INDEXED XML DATA

RELATED APPLICATIONS

This Application is a National Phase of PCT Patent Application No. PCT/IL2009/000609 having International filing date of Jun. 18, 2009, which claims the benefit of U.S. Provisional Patent Application No. 61/074,311 filed on Jun. 20, 2008. The contents of the above Applications are all incorporated herein by reference.

FIELD AND BACKGROUND OF THE INVENTION

The present invention relates to a device and method for incremental clustering of indexed XML data in a paged data storage system and, more particularly, but not exclusively to such clustering in the case of a basic tree structure co-existing with indexing.

We consider the problem of partitioning an XML document for storage on disk. Currently there are two main approaches for storing XML documents. The first approach maps an XML document to a relational table where each row represents an edge in the document's XML tree. Existing relational operators are used for traversing over XML stored documents. The second approach, native XML Storage, intends to store an XML document as a tree. The entire XML tree is partitioned into distinct records containing disjoint connected subtrees. These records are stored on disk pages, either in an unparsed, textual form, or using some internal representation. In native XML Database systems, document processing is dominated by path-dependent navigational XPath queries which are aided by path indices that reduce the number of navigation steps across stored XML records. Thus, disk-resident XPath processors employ a mixed, i.e., part navigational, part indexed, processing model. Therefore, smart clustering of related data items is beneficial. Here, two document nodes are related if they are connected via an edge, and examining one of them is likely to lead to examining the other.

Data clustering has been shown to be beneficial for hierarchical databases such as IBM's IMS, and for object-oriented databases (OODBs).

An algorithm, XC, that clusters XML documents using a tree partitioning approach, is presented in R. Bordawekar and O. Shmueli. Flexible workload-aware clustering of xml documents. In XSym, pages 204-218, 2004. XC uses XML navigational behavior, recorded as edge weights, to direct its document partitioning. This behavior may be determined by XPath processing or some other processing methodology.

XC is based on Lukes' tree partitioning algorithm. However, performing clustering based on navigational behavior as encoded in the parent-child edge weights is not sufficient. It misses the fact that often children of a parent are accessed successively. This means that to reduce the number of page faults, affinity among sibling nodes should also, be taken into account. XS, an extended version of the XC algorithm, clusters an XML document taking into account navigational affinity among sibling nodes. Kanne and Moerkotte present algorithms for partitioning XML documents by also using sibling edges. However, their algorithms do not take workload information into account.

The workload, namely which queries and in what frequency and importance level, plays an important role as the data that is accessed is frequently workload determined. Hence, it is important for the physical organization to match the workload. However, the workload may change, which means that ideally the data physical organization needs to change as well. A practical algorithm, PIXSAR, which is based on XS, is presented in U.S. Provisional Patent Application No. 61/054,249 whose priority is claimed herewith. PIXSAR incrementally clusters XML documents while taking into account navigational affinity among sibling nodes. It makes decisions on the fly, and selectively reclusters parts of the augmented document tree that experience significant changes in access behavior.

The main parameters used by PIXSAR are the radius which determines the pages that are to be reclustered (intuitively, this parameter reflects the maximum distance of pages that are affected by a change in a document), and the sensitivity of reclustering triggering.

However, in addition to the XML augmented tree, there are also indices. Most database and repository systems use path indices that reduce the number of navigation steps across stored XML nodes. Thus, disk-resident XPath processors employ a mixed, i.e., part navigational, part indexed, processing model.

The kind of index we consider is based on a XPath expression and it consists of index entries pointing to XML target nodes. Using such index entries, one jumps directly to target nodes. Often, target XML nodes are accessed in temporal proximity and hence, for paging reasons, it is beneficial to store them on the same disk page. In other cases, such temporal proximity is absent and hence co-storing is not optimal.

A problem however arises in that the indexing demands a tree structure for the document that is different from that defined by the father daughter and sibling nodes. While PIXSAR can carry out reclustering based on a tree structure and edges within that tree structure defining relationships between nodes, what is it to do when two or more competing tree structures are being used together to access the same data?

It is noted that in the known art, notwithstanding the presence of indexing, all the problems are explored on the basic tree. This is true of Lukes' algorithm, the XC algorithm and primary NATIX algorithms. As time passed, the solutions were broadened to a tree augmented with sibling edges, thus the XS algorithm and NATIX new algorithms. However there is no teaching of what to do in the case of competing trees superimposed on the same data.

SUMMARY OF THE INVENTION

In the present embodiments dynamic reclustering in response to a change in workload is carried out based on two or more competing trees in the same data structure, and the tree whose reclustering is the most efficient is selected for continued use.

According to one aspect of the present invention there is provided, in a data storage and retrieval system wherein data is stored and retrieved in pages, comprising connected nodes arranged such that each page stores complete nodes, the connected nodes being connected via a plurality of overlapping tree structures, a method of minimizing page retrieval in the face of changing relationships between nodes comprising:

selecting at least two of the overlapping tree structures;

incrementally adjusting the association of nodes to pages dynamically based on real time workload, separately according to each selected tree structure, to form modified partitions for each tree structure, each modified partition being so as to reduce expected page faults;

for each modified partition calculating a modification gain to indicate which partition has provided a greater expected minimization of page faults; and selecting the tree structure and modified partition corresponding to a largest of the modification gains for continued modification of the page node structure within the data storage and retrieval system.

It is noted that nodes that are bigger than a page translated to a few nodes such that each page stores complete nodes.

In an embodiment, the data is XML and at least one of the overlapping trees comprises an index of entries pointing to XML target nodes, and each index target node may form an XML sub-tree. In case several subtrees having roots in the index target node overlap, some edges are deleted from the index structure in order to preserve a tree structure.

In an embodiment, the selecting comprises making a storage decision for respective ones of the XML target nodes based on membership of the target node in more than one tree.

In an embodiment, the nodes are connected by edges, each edge being dynamically assigned a weighting based on whether the corresponding nodes are retrieved in temporal proximity, the modification gain comprising an increase in relative weightings of pages brought about by the reclustering.

In an embodiment, the selecting at least two of the overlapping tree structures comprises making a randomized selection from among a plurality of trees.

According to a second embodiment of the present invention there is provided a data storage and retrieval system wherein data is stored and retrieved in pages, the data comprising connected nodes arranged such that each page stores only complete nodes, the connected nodes being connected via a plurality of overlapping tree structures, the system comprising:

a test tree selector unit for selecting two or more of the overlapping tree structures;

a dynamic page structure modification unit for incrementally adjusting a page node structure dynamically based on real time workload, based on one or more tree structures selected by the tree selector unit, for each selection forming modified partitions for each tree structure, each modified partition being so as to reduce expected page faults;

a partition selector unit for calculating a modification gain to indicate which partition has provided a greater expected reduction of page faults and selecting the tree structure and modified partition corresponding to a largest of the modification gains for continued modification of the page node structure within the data storage and retrieval system, thereby reducing page faults in the face of changing relationships between nodes.

In an embodiment, the data is XML and at least one of the overlapping trees comprises an index of entries pointing to XML target nodes which in turn are roots of XML sub-trees. As noted above, in case some of the subtrees having roots in the index target node overlap, some edges may be deleted from the index structure in order to preserve a tree structure.

In an embodiment, the partition selector unit is configured to make a storage decision for respective ones of the XML target nodes and associated sub-trees by assigning nodes to pages based on selection of one of the overlapping trees to which the target nodes belong.

In an embodiment, the nodes are connected by edges, each edge being dynamically assigned a weighting based on whether the corresponding nodes are retrieved in temporal proximity, the modification gain comprising an increase in relative weightings of pages brought about by the reclustering.

In an embodiment, the test tree selector unit uses a randomized selection and the selecting at least one of the overlapping tree structures comprises making a randomized selection.

According to a third aspect of the present invention there is provided, in a two level data storage and retrieval system having a first level of relatively fast storage and retrieval and a second level of relatively slow storage and retrieval, wherein data is arranged as a tree of nodes and edges, each edge defining a relationship between two nodes in the tree, a method comprising:

monitoring ongoing data retrieval to find retrieval patterns of nodes which are retrieved in temporal proximity and to identify changes in the retrieval patterns over time;

recording the retrieval patterns as weightings to respective edges, and periodically rearranging the data nodes among the storage levels dynamically during usage of the data to reflect the changes, so that a summation of edges between the first and second storage level is kept small, thereby to keep small an overall expected number of crossing to the second level from the first level during data retrieval despite dynamic changes in patterns of data retrieval.

In an embodiment, the recording the retrieval patterns comprises incrementing weightings of a given edge when respective nodes are retrieved together within the temporal proximity.

In an embodiment, the periodically rearranging is triggered at a preset interval.

In an embodiment, the respective edges comprise parent-child edges between nodes in succeeding layers of the tree.

In an embodiment, the respective edges comprise sibling edges between nodes in a same layer of the tree.

In an embodiment, the keeping the summation of edges small is carried out by repeated minimization using a greedy algorithm In an embodiment, the data arranged in nodes comprises an XML file arranged as a tree with an XML root being the tree root and further comprising edges between adjacent sibling nodes.

In a further aspect of the present invention a random selection is made of just one of the various overlapping trees. Modification of the pages is then carried out dynamically as above but based on the single randomly selected tree.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2A-2D are simplified diagrams showing an XML document and how multiple overlapping trees can be superimposed thereon;

FIGS. 7A-7C are simplified diagrams illustrating data storage before and after a reclustering operation carried out according to an embodiment of the present invention;

FIG. 12 is an example of a full index structure prior to fixing, according to a further embodiment of the present invention;

FIG. 13 shows a case of overlapping sub trees of the index structure of FIG. 12; and FIG. 14 shows the index augmented tree of FIG. 12 after fixing the initial index structure.

DESCRIPTION OF THE PREFERRED EMBODIMENTS

Figure 1:
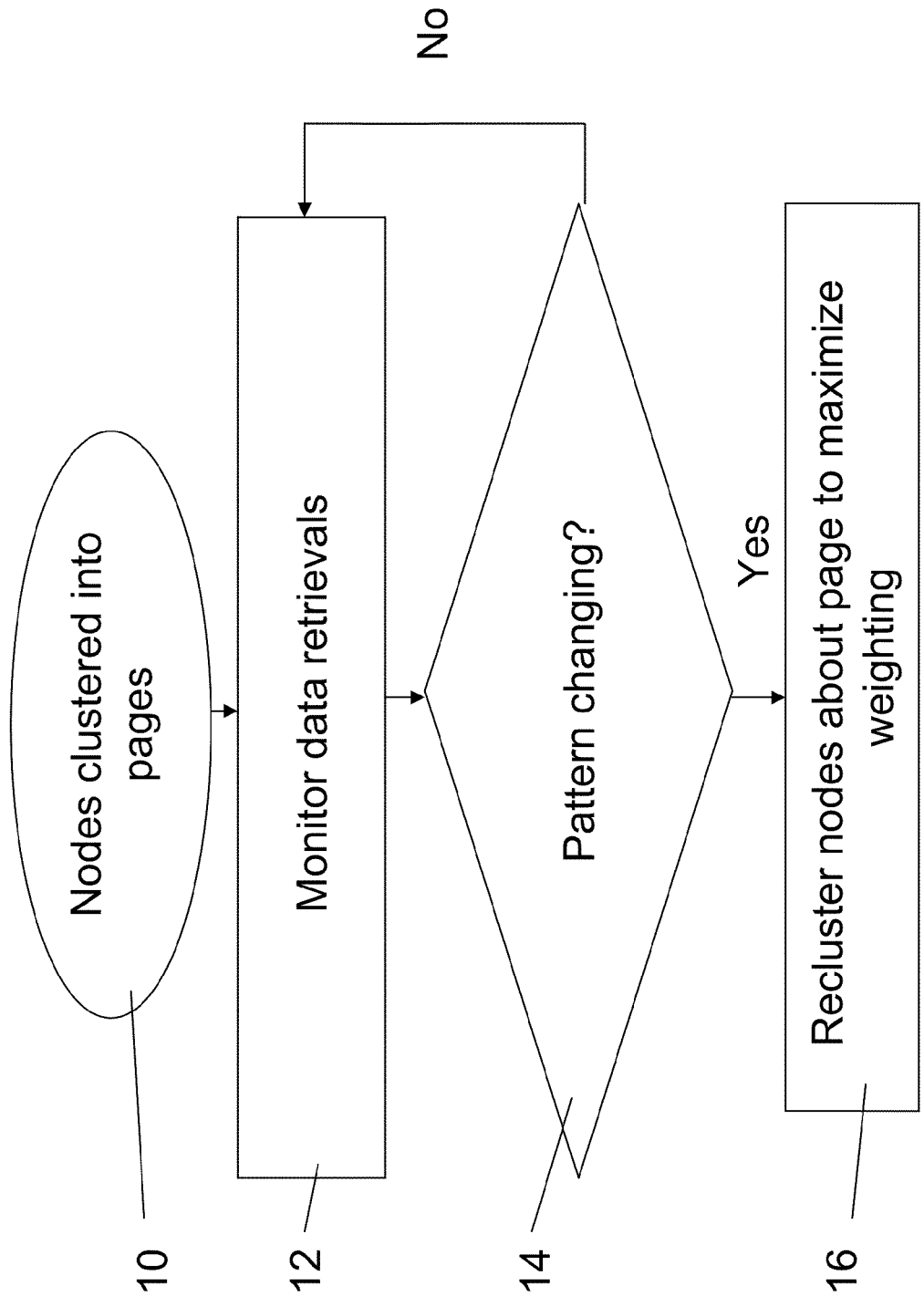
FIG. 1 is a simplified flow chart, illustrating a procedure for dynamic reclustering of nodes between pages according to the present embodiments.

The present invention relates to a device and method for incremental clustering of indexed XML data in a paged data storage system and, more particularly, but not exclusively to such clustering in the case of a basic tree structure co-existing with indexing.

XML is one of the primary encoding schemes for data and knowledge. We investigate incremental physical data clustering for native XML data. We view the XML clustering problem as a sibling-augmented tree partitioning problem.

In U.S. Provisional Patent Application No. 61/054,249 whose priority is claimed herewith we suggest an incremental algorithm that adjusts the storage structure dynamically based on real time workload, so as to minimize page faults. However, in addition to the XML augmented tree, there are also indices. The kind of index we consider is based on a XPath expression and it consists of index entries pointing to XML target nodes. Using such index entries one jumps directly to target nodes. Often, target XML nodes are accessed in temporal proximity and hence, for paging reasons, it is beneficial to store them on the same disk page. In other cases, such temporal proximity is absent and hence co-storing is not optimal.

Designing an algorithm that views the XML data and indices as a sibling augmented tree with multiple roots (the additional roots correspond to indices) is complex. In this work we propose an extension to the PIXSAR algorithm, called iPIX-SAR, which extends PIXSAR so as to make storing decisions of target XML nodes based on possible membership in more than one tree.

We use an experimental data clustering system that includes a disk and File System simulator. Instead of implementing a query processor, we "record" logs of Saxon runs and emulate them in our system. To make experimentation feasible, we constructed a disk, main memory, resident simulator.

In U.S. Provisional Patent Application No. 61/054,249 we compare PIXSAR to DFS, on a simulated and on a real physical disk. We find that PIXSAR results are better than DFS by 20% to 50% on a simulated disk and 60% better on a real disk. In this work we experimentally show that in the presence of indices iPIXSAR is superior to PIXSAR when used alone.

iPIXSAR provides a practical extension of the PIXSAR algorithm for incremental XML reclustering of documents with XPath indexed nodes. iPIXSAR views the XML file as a sibling-augmented tree in which some of the nodes are target nodes of indices (i.e., pointed from index entries).

In the present disclosure we consider the case of the Multi Rooted Tree (MRT). Practically, we may consider each index as an additional root to certain subtrees of the basic tree. There is no known $O(nP^{*k})$ precise partitioning algorithm for this problem. A precise partition is non-trivial and left for future work. In the present disclosure we present an extension of the PIXSAR algorithm, called iPIXSAR. iPIXSAR uses a heuristic solution, based on comparison between the partitions that are induced independently by the corresponding trees in the MRT. The presently claimed solution is incremental, as carrying out full reclustering is not practical.

iPIXSAR exploits the observed XML navigational behavior, through edges as well as indices, to direct its incremental partitioning activity. The basic idea is that it considers imaginary and weighted edges between adjacent index target nodes. Incremental clustering modifications are based on both the PIXSAR algorithm and also on weights assigned to these imaginary edges. The assignment of weights to these imaginary edges is based on an adaptation of PIXSAR's edge weight assigner.

For performance evaluation, we construct an extensive infrastructure. It includes a simulated, memory resident, disk and a simple File System to manage it. To allow workload tracking and data reclustering, a detailed disk-page format was designed and implemented. Another issue was how to generate the query workload. The method used is to take an industrial strength XPath query processor, Saxon, trace its operations on actual XML files and transform the navigational behavior to our setting. On this infrastructure, extensive experimentation on a large combination of relevant parameters was conducted. We experimentally show that although there are additional overhead expenses due to a large number of trees, nevertheless, iPIXSAR is far superior to PIXSAR used alone. In particular we observe savings of 4% to 8%. Previous experience demonstrates that experiments with a real that is a physical, disk give much better results than experiments on a simulated disk. So we expect significantly higher results while experimenting with indices on a real disk.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1 which is a simplified flow chart illustrating dynamic reclustering of nodes based on changes in usage pattern over time. In a data storage and retrieval system data is arranged in nodes, and the nodes are stored and retrieved in pages, so that each page is made up of a cluster of nodes. The nodes are in a tree structure of father and daughter nodes and sibling nodes. The data begins the process already clustered into pages in some way—stage 10.

In stage 12, monitoring is carried out of ongoing data retrieval to find retrieval patterns of nodes which are retrieved together and in particular to identify changes in retrieval patterns over time. Thus two nodes A and B may initially be retrieved together frequently, but as time goes on node B is retrieved less and less, and node A begins to be retrieved more frequently with another node C. The monitoring of stage 12 may identify such a change in decision box 14.

In stage 16, periodic reclustering of the data nodes among the pages is carried out dynamically during usage of the data to reflect the changes, so that nodes more often retrieved together are migrated to cluster together and nodes more often required separately are migrated to cluster separately. Thus in the above example, initially nodes A and B are clustered together on the same page, but as time goes on node A migrates away from B and towards C as the clustering is updated. The idea is that the number of page retrievals is kept to a minimum since different data nodes that are needed together tend to be on the same pages, and remain so even though data usage changes over time.

However the nodes are not only related in the father-daughter or sibling relationships—hereinafter the basic tree structure. In addition, the data is indexed, say with an index page and hotlinks, or in any other way that provides paths through the nodes other than that of the basic layout of the data.

As a result of the indexing, there are thus other paths between the nodes than those defined by the basic tree structure. Two nodes successively appearing in an indexed search for a common keyword may be very likely to be retrieved together even though there may be no father-daughter or sibling relationship between them.

The situation is illustrated in FIG. 2. FIG. 2a shows an XML document. FIG. 2b shows the basic tree structure. FIG. 2c shows the document indexed for a search for b. FIG. 2d shows the full graph. It will be apparent that the index tree allows for the two b nodes to share a common edge. The basic tree structure does not.

Figure 3:
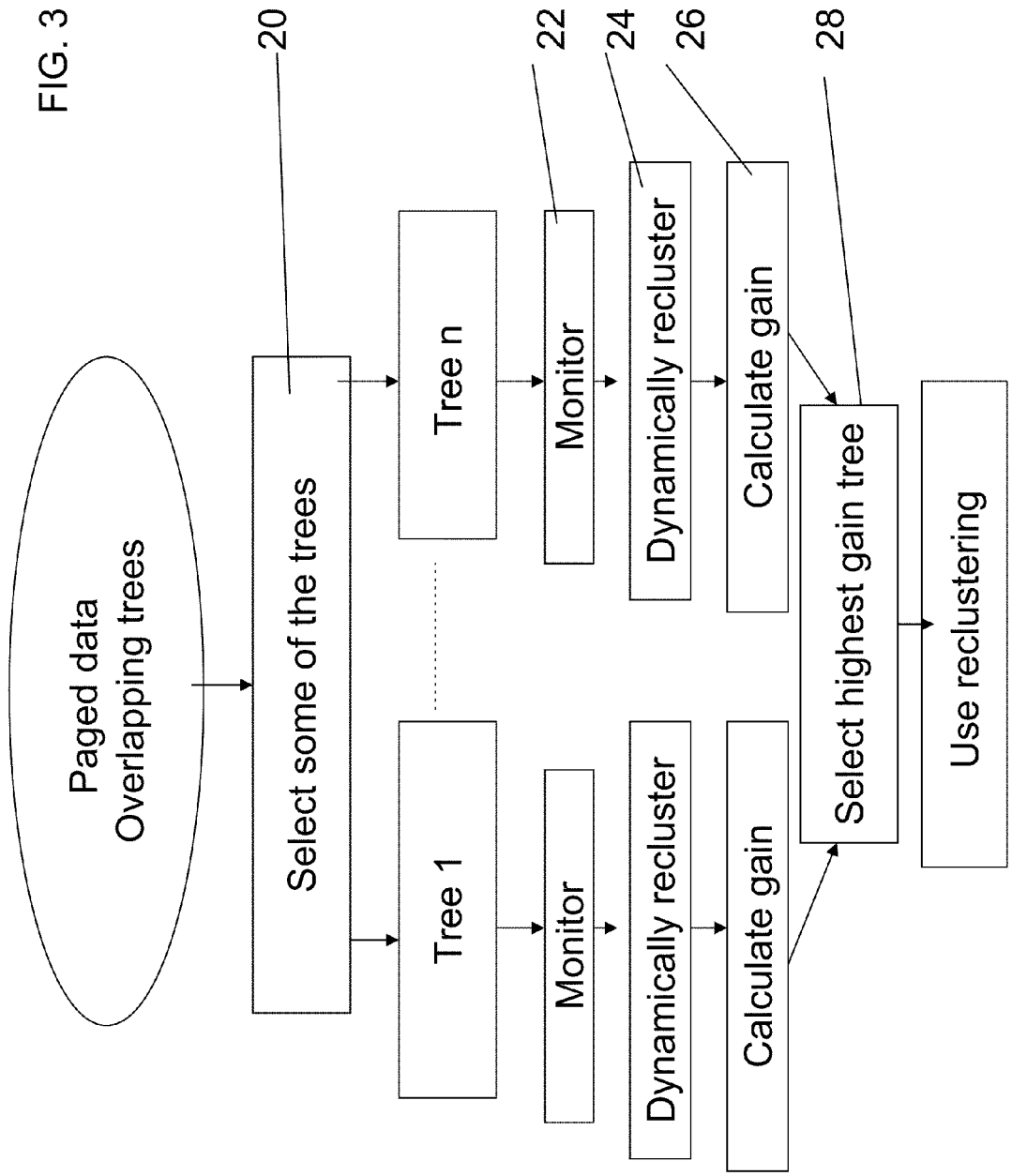
FIG. 3 is a simplified flow chart illustrating a procedure for selecting between reclustering based on different overlapping trees according to an embodiment of the present invention.

Reference is now made to FIG. 3, which illustrates a method of using the dynamic reclustering of FIG. 1 in the case where there is more than one valid tree structure that might be defining retrieval behavior of the data.

In stage 20, two or more of the overlapping tree structures are selected. The number that is selected is not too large so as not to create too much of a calculation load, but enough not to be irrelevant. In an embodiment the selection may be random.

Each tree selected is used as the basis of dynamic restructuring based on actual workload—stages 22 and 24, involving incrementally adjusting the page node structure dynamically based on real time workload. The result is modified partitions for each tree structure, each modified partition being so as to minimize page faults.

Now in stage 26, for each modified partition a modification gain may be calculated, to provide a numerical indication of how effective reclustering based on that particular tree is, that is to say to indicate which partition has provided a greater minimization of page faults. Then in stage 28 the tree structure giving the best gain is selected, and its partition modification is used to recluster the nodes in the storage device.

The data may be XML and at least one of said overlapping trees comprises an index of entries pointing to XML target nodes. An index may comprise the following structure. The index may comprise a dummy node which is the root of the structure. The children of this root are referred to as the index target nodes. Every two following children nodes have an edge between them. Each index target node may be pointed to by an index entry. Each index target node may further be a root of a subtree. All these subtrees are part of the Base tree, that is the tree that corresponds to the XML document itself without indices.

Thus, the collection of subtrees pointed from an index may be overlapping, that is one subtree may be contained wholly within another, as per FIGS. 12, and 13 hereinbelow. In order to be able to perform reclustering one removes some edges from the Index structure in order to create an index augmented tree. The removed edges are: the edge between the index root and the subtree that is contained in another subtree, and the edge between the root of the contained subtree and the root of the containing subtree.

The selecting of the tree structure may involve making a storage decision for the various XML target nodes based on membership of the target node in more than one tree.

The nodes, in any of the tree structures, are connected by edges, each edge being dynamically assigned a weighting based on whether the corresponding nodes are retrieved jointly or separately, the modification gain comprising an increase in relative weightings of pages brought about by the reclustering.

Figure 4:
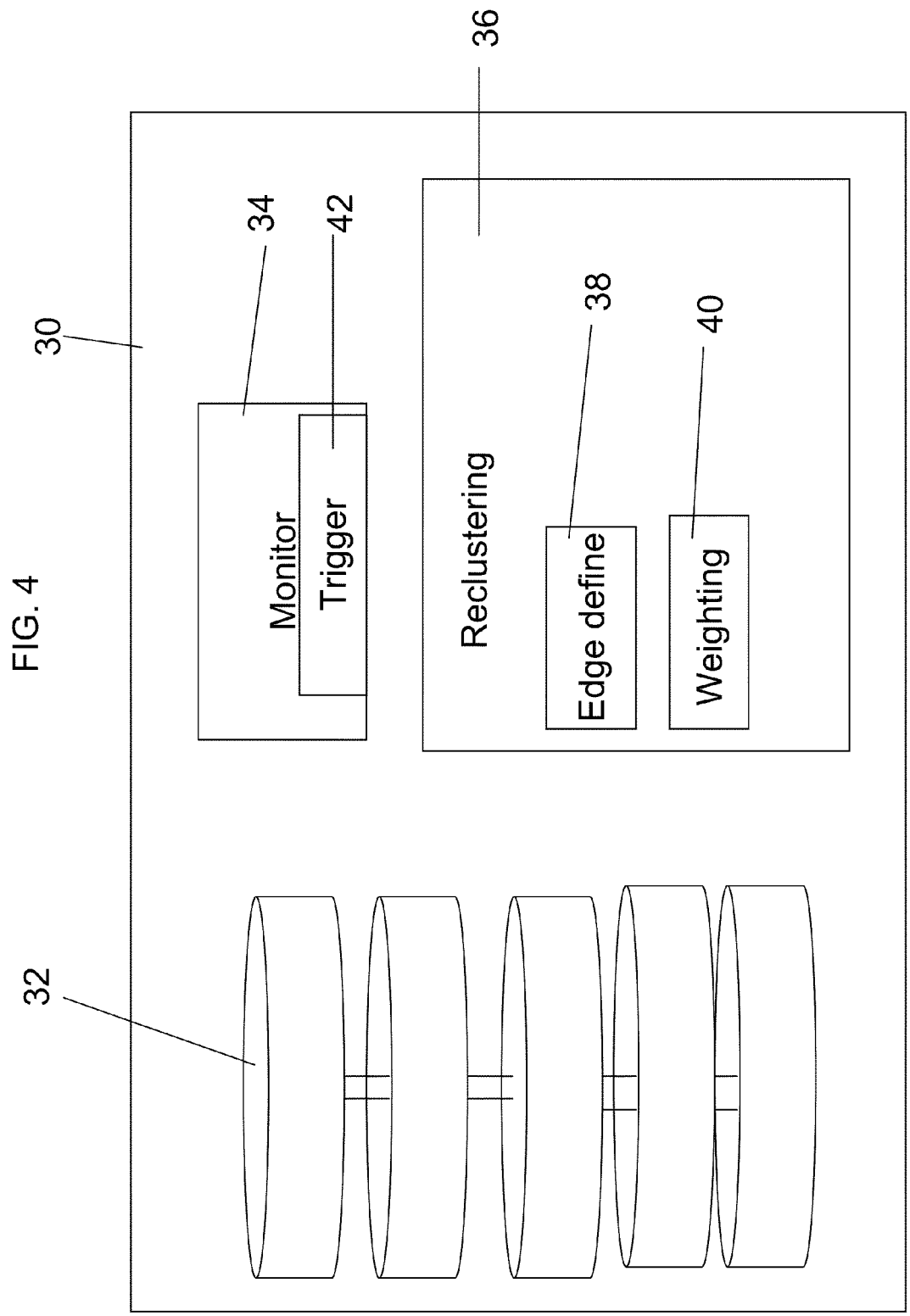
FIG. 4 is a simplified block diagram illustrating a memory device in a system for carrying out dynamic reclustering.

Reference is now made to FIG. 4, which is a simplified block diagram illustrating a data storage and retrieval system 30 with a dynamic page structure modification unit, wherein data arranged in nodes is stored and retrieved in pages from a memory device 32. Each page comprises multiple nodes, as discussed above.

Monitoring unit 34 monitors ongoing data retrieval to find retrieval patterns of nodes which are retrieved together and to identify changes in the retrieval patterns over time, as discussed. Node reclustering unit 36 then periodically reclusters the data nodes among the pages dynamically to reflect the changes in data usage. The aim is that nodes more often retrieved together are migrated to cluster on shared pages and nodes more often required separately are migrated towards separate pages. Thus the overall number of page accesses needed for data retrieval is kept to a minimum despite dynamic changes in patterns of data retrieval.

The reclustering unit 36 may include an edge definer 38 for defining edges between pairs of nodes, and a weighting unit 40 which assigning weightings to the edges and increments and decrements the weighting according to whether the two nodes joined by the edge are retrieved together or separately.

The monitor, may include a reclustering triggering unit 42 for periodically checking for pages where weightings have changed beyond a threshold amount. The triggering unit triggers the reclustering unit to recluster nodes about the triggered pages and as mentioned the reclustering involves migration of the nodes whose weightings have changed so as to maximize weightings within pages and minimize weightings between pages.

Figure 5:
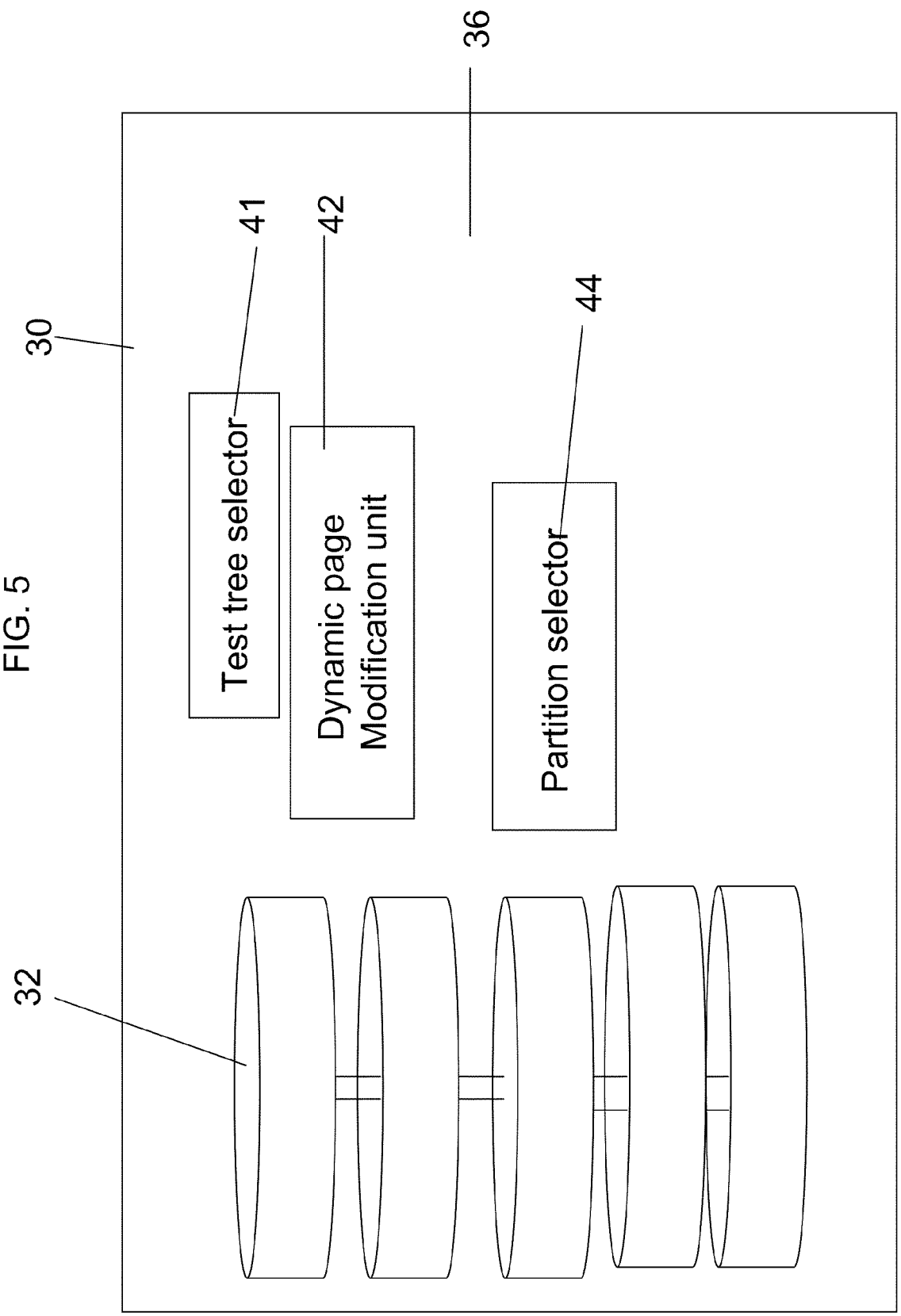
FIG. 5 is a simplified diagram showing a modification of the device of FIG. 4 for selecting between different reclustering attempts based on different overlapping trees, according to an embodiment of the present invention.

Reference is now made to FIG. 5, which shows how the device of FIG. 4 is modified to manage data having overlapping tree structures. In FIG. 5, the system further comprises a test tree selector unit 41 which selects two or more, but generally not all, of the overlapping tree structures.

A dynamic page structure modification unit 42 carries out the dynamic partitioning tasks discussed with respect to FIG. 4 above.

A partition selector unit 44 calculates a modification gain for each tree for which reclustering has been used to provide a new partition, to indicate which partition has provided a greater minimization of page faults. The partition selector then selects the tree structure and modified partition corresponding to the largest gain for actual use.

In a modification, a single one of the overlapping trees may be selected at random and then modified dynamically during data retrieval. Thus the need to choose between trees is obviated.

The XML data tree to be partitioned is an augmented clustering tree, namely an XML tree with node sizes and edge weights. Roughly, the edge weights model the (usually XPath) navigational behavior. Specifically, higher edge weights mean that the connected XML nodes are traversed more often in temporal proximity. An XML node size includes the text size of the XML node as well as various references, such as parent, sibling, etc. and space associated with, parent and sibling references, in other words the graph edges. The problem is to partition the set of nodes of the clustering tree into node-disjoint subsets, called clusters so that each cluster fits into a disk page, and the total of the intra-cluster edges' weights, called the partition's cut value, is maximized. An alternative way of wording this requirement is to say that the sum of the inter-page edges, called cost, is minimized. Intuitively, a higher value partition results in fewer disk accesses.

Figure 6:
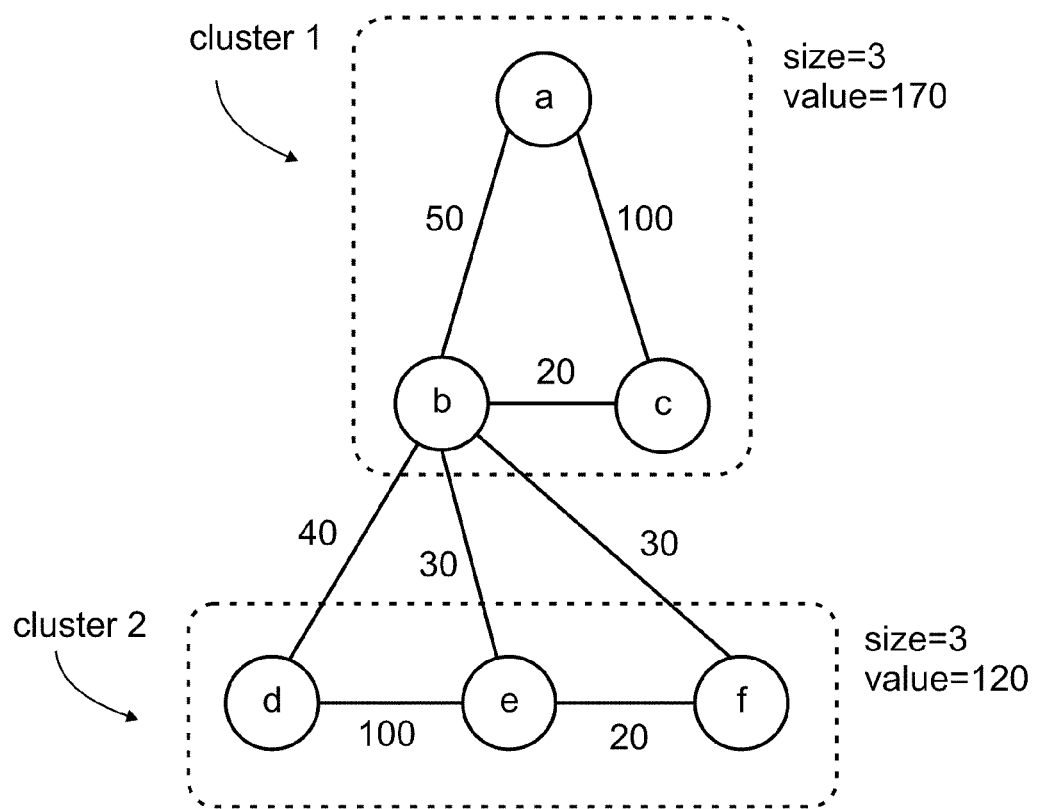
FIG. 6 is a simplified diagram illustrating clustering into two clusters of size 3 within a six node system.

Both XC and XS are dynamic programming algorithms that provide practical approximate solutions to the XML clustering problem. While XC operates on a weighted rooted tree, XS operates on a weighted rooted tree augmented with sibling edges. Reference is made in this connection to FIG. 6, which displays a partition of an augmented tree consisting of two clusters. Both algorithms produce a partition of the input tree nodes into a set of clusters, which are then stored on disk pages. In this case both clusters have a size (no. of included nodes) of 3. The first cluster has a value of 170 and the second cluster has a value of 120.

PIXSAR operates as follows. Current information as to edge weights is maintained per edge, per page and globally. Historical data is maintained per page and globally. When the sum of edge weights of a particular page is judged to be too light or its outgoing edges are too heavy reclustering is triggered. This process is based on parameters that control detection sensitivity and the extent of reclustering in terms of number of pages and edge-distance from the triggering point. The reclustering work itself is done via XS.

PIXSAR incrementally improves the placement of the document on disk based on the actual querying activity, the workload. As time progresses, the workload associated with the document may change. The main idea behind the reclustering algorithm is to adjust the document placement on disk, after an initial clustering, to the actual workload, so that the number of page faults is reduced.

iPIXSAR takes care of an additional problem, namely the case of the Multi Rooted Tree (MRT): iPIXSAR addresses the effects of indexing, something not addressed by PIXSAR, and takes into account the affinity between nodes that are target nodes of subsequent index entries of some index and do not necessarily have a parent-child or sibling edge between them.

Index-Based Incremental Reclustering

The Reclustering Radius determines the pages that are to be reclustered. Intuitively, this parameter reflects the maximum distance of pages that are affected by a change in any given page. The decision as to whether reclustering is required is based on cumulative changes in pages rather than nodes. This is due to space considerations. To this end, each page contains special data items for determining whether reclustering is needed. These special items include initial and incremental counters of internal and outgoing edge weights associated with the page, and the location of the global counter which contains the sum of all edge weights in the entire augmented tree at selected points in time. The global counter is part of an array of global counters. Following each reclustering, the current global counter is added to that array. In a case in which there is no free slot in the global counter array, we may conduct a cleaning operation on the array. During such a cleaning operation, we may remove for example each third global counter. In case the algorithm needs to access a deleted global counter, it uses an approximation of the global counter, the counter with the closest index to the deleted one.

We now define some of the terminology we use:
Index: is a set of index entries. The collection is based on an XPath index expression. For example, an index X may be based on the XPath expression /a/b/c.
Index entry: is an entry in the index set with a pointer to a node that conforms to the index expression. Continuing the example, an index entry e in index X would include a pointer to a c-labeled node, say v, in the XML document, whose parent is a b-labeled node that has an a-labeled parent that is child of the root.

Index Target Node: A node that is pointed by an index entry of a particular index is called a target (XML) node of that index entry. Node v in the example is an index target node.

All edges in the graph are unidirectional. The direction is from a node to its parent, from a node to its left sibling and from an index target node to the immediately previous index target node. For simplicity of presentation, assume we have a single index, say X, which is based on a XPath expression exp.

Let $e_1; \ldots; e_n$ be the index entries and let $x_1; \ldots; x_n$ be the corresponding index target nodes. Each $e_i$ also contains the weight of the virtual edge $(x_i; x_{i+1})$, $0<i<n$. iPIXSAR extends PIXSAR and relies on the same infrastructure (to be detailed in the following section hereinbelow).

The intuition underlying iPIXSAR is as follows:

Select trees out of the full document graph. The trees correspond to the basic XML hierarchical structure as well as trees implied by indices. Not all the available trees need be chosen and selection may be random.

Determine the profit in cut value that PIXSAR provides on each of these trees.

Perform reclustering based on the most profitable tree.

The heart of the incremental reclustering algorithm, IncrementalR, is procedure XS. The procedure takes as input a data subtree (augmented with sibling edges) and produces a partitioning of the tree into a set of clusters. XS is based on the augmented tree clustering algorithm and on the techniques used in the clustering systems that mainly deal with limiting memory usage and processing time. XS produces an approximate solution whose accuracy depends on the available memory and time resources.

iPIXSAR extends PIXSAR in its way of updating the edge weights and in the reclustering operation itself (incrementalRecluster operation).

We use two variables in this algorithm. The first is a reclustering flag, which is set to on as soon as we determine that reclustering is needed, having been initially set to off. The second is a reclustering node, which holds the node that caused the reclustering decision.

The IncrementalR algorithm is presented in Table 1.

The function runIncrRecluster(v) in line 1.2 is described later on and in the table. The motivation of the "if" in line 5 is to reduce the number of times in which we check whether reclustering is needed: The function toRecluster(v) in line 5.0 is explained in the following section hereinbelow. The motivation of line 5.1 is to provide an indication of the necessity of a reclustering in line 1.0.

TABLE 1

The Incremental R Algorithm.

For each traversed node v:
1. if (v is first node of the query)
1.0 if (rFlag = on)
1.1 rFlag = off
1.2 runIncrRecluster(v)
2. Update the weight of all edges that connect v to other nodes that are "close enough" by using the TPA algorithm.
3. if (v is index target node xi of index X)
3.0 update the weight of the (xi; xi,1) edge provided xi and xi,1 are "close enough".
4. Update the incremental weight counters of v's page.
5. if (random( ) < q).
5.0 if (toRecluster(v))
5.1 if rFlag = off TABLE 1-continued The Incremental R Algorithm.

5.2 rFlag = on
5.3 rNode = v

To describe the runIncrRecluster(v) function we refer to FIG. 2 and use the following definitions:

Base augmented tree: The base document tree augmented with sibling edges. That is, the root of the tree is the document root.

X index augmented tree: X is an index. The root of the tree is a dummy node with the name of the corresponding index, X (note that the root node of this tree does not exist in the disk). The children of this X node are all the index target nodes of X. Every two sibling index target nodes ($x_i$ and $x_{i-1}$) have an edge between them. The subtree rooted at each index target node $x_i$ is exactly as in the base augmented tree.

Full graph: is the base augmented tree unioned with all index augmented trees.

Gain in cut value: The difference in cut value, before and after reclustering operation, in the full graph. Note that because root nodes of index augmented trees are dummy nodes, we do not count the edge weights of these nodes while calculating the gain in cut value.

FIG. 2 shows all the possible trees for the document appearing in FIG. 2(a). There is one index named X that corresponds to the expression: "/root/a/b". Observe that in general there may be additional indices. FIGS. 12 and 13 shows a case of overlapping subtrees of the index tree. FIG. 14 shows the index tree after removing some edges from the index structure, as discussed in greater detail below.

Three variables are used in the runIncrRecluster(v) function. The first is maxGain, which holds the maximal found gain in cut value. The value is initially set to 0. The second is maxTreePointer, which holds a pointer to a tree that gives us the maximal gain in cut value. The third is indicesList.

The runIncrRecluster(v) function is presented in Table 2. The max(x; y) function in line 3.3.5 returns the maximum between x and y.

PIXSAR Incremental Triggering

While traversing the augmented tree, edge weights are modified by the Temporal Proximity algorithm described in U.S. Provisional Patent Application No. 61/054,249. Changes of some edge weights may lower the quality of the partition, and reclustering of some part of the augmented tree is useful. The triggering algorithm determines when a change of an edge weight should cause reclustering.

TABLE 2

The runIncrRecluster Algorithm.

1. Build S, the part of the base augmented tree that has to participate in the reclustering. During building:
1.0 Fill indicesList with target index nodes which are part of S.
2. maxTreePointer = pointerTo(S)
3. if (indicesList is not empty)
3.0 Convert S into procedure XS' internal data format, IS.
3.1 Run XS on IS.
3.2 maxGain = the gain in cut value that XS achieves on IS.
3.3 For each X in indicesList:
3.3.0 Build I, the part of the corresponding X index augmented tree that has to participate in the reclustering.
3.3.1 Convert I into procedure XS' internal data format, II.
3.3.3 Run XS on II.
3.3.4 tmpGain = the gain in cut value that XS achieves on II.

TABLE 2-continued

The runIncrRecluster Algorithm.

3.3.5 maxGain = max(maxGain; tmpGain)
3.3.6 if (notEqual(maxGain; tempGain))
3.3.7 maxTreeP ointer = pointerTo(I)
4. Convert the tree maxTree pointed by maxTreePointer into procedure XS' internal data format,IMT.
5. Run XS on IMT.
6. Assign each resulting cluster to a page having sufficient space to hold it. During each assignment do as follows:
6.0 Write the current state of the page (internal and external) weights into the page counters.
6.1 Add the current global counter to the global counters array.
6.2 Write the ID of the current global counter to the page.

In this document, an internal edge is an edge connecting two nodes residing in the same disk page. An external edge is an edge connecting two nodes residing on different disk pages. Intuitively, an edge should cause reclustering when its weight is changed significantly, relatively to all other tree edges. Such a change means that traffic through this edge has significantly increased, or for that matter decreased, relative to other edges.

When an edge is an external edge, and the traffic through it is smaller, the value of the partition is relatively improved. In a similar way, when an edge is an internal edge, and the traffic through it increases, the partition value is relatively improved. So, reclustering need be triggered only when an edge is an external edge and the traffic through it relatively increases, or when an edge is an internal edge and the traffic through it relatively decreases. The triggering of reclustering is based on changes in pages rather than nodes, since it may be impractical to track changes at the level of nodes. To formally describe the triggering test, we define the following counters:

IIC—Internal Incremental Counter,
EIC—External Incremental Counter,
IPC—Internal Preliminary Counter,
EPC—External Preliminary Counter,
GPC—Global Preliminary Counter, and
TRF—Triggering Reclustering Factor.

The boolean function toRecluster determines if reclustering is needed. It return true when one of the following holds:

The proportion of IIC+IPC of the new GPC becomes smaller by at least TRF in comparison to the proportion of IPC of the old GPC, i.e., (IIC+IPC)/$GPC_{NEW}$/(IPC/$GPC_{OLD}$)<(100−TRF)/100.

The proportion of EIC+EPC of the new GPC becomes bigger by at least TRF in comparison to the proportion of EPC of the old GPC, i.e., (EIC+EPC)/$GPC_{NEW}$/(EPC/$GPC_{OLD}$)>(100+TRF)/100.

Example

To illustrate the iPIXSAR algorithm, we present an example in FIG. 7. For this example, we define the page size to be 3 (say KB), node size to have a fixed size of 1, TRF to be 2% and reclusteringRadius as 1. The left side of FIG. 7(a) shows the disk state after running initial clustering, and before starting to traverse the document. We observe that the IPC and EPS counters contain the corresponding initial values, while IIC and EIS are zero, because the traversal has not yet started. The right side of FIG. 7(a) shows the disk state right after traversing edge (a, b) (the rightmost b) i.e., while visiting node b. IIC and EIC are updated and contain the difference between the current and the initial values of the page's counters.

In the next step, we run the triggering test on page 1 (the page in which node b resides) and discover that the percentage of IPC over $GPC_{OLD}$ is 30% while IIC+IPC as a proportion of $GPC_{NEW}$ is 27%. Since 27/30=0.90<0.98, triggering occurs. So, reclustering is needed. The part that is reclustered includes pages 1, 2 and 3. Page 4 does not participate in the reclustering because its distance from page 1 is two steps which is greater than the Radius value of 1. The reclustering area in the base augmented tree contains index target nodes. So we check the gain in cut value for two trees (the base augmented tree and the X index augmented tree). FIG. 7(b) shows the optional reclustering for the base augmented tree.

FIG. 7(c) shows the optional reclustering for the X index augmented tree. We find that the gain in cut value for the base augmented tree is 3 (40−37) while for the X index augmented tree it is 12 (40−28). So, we perform reclustering on the X index augmented tree (FIG. 7(c)). Note that IIC and EIC in pages 1, 2 and 3 (the pages that participated in the reclustering operation) directly after the reclustering remain at zero, since they have not yet been traversed as of the last reclustering.

Prototype System

We constructed an experimental platform for evaluating incremental storage algorithms. The platform is composed of a disk simulator for storing XML documents, a File System simulator and the Saxon-L simulator which mimics the Saxon XPath query processor.

Disk Simulator

We implement a simple disk simulator which stores and manages XML tree nodes. The disk is implemented as a linear array of pages (see discussion below). Each page contains a page directory and page data. The page directory holds the meta information about the current page. The relevant data is described in Table 3. Page directory holds additional fields, for example a pointer to the beginning of free space in the page, number of entries in the directory, overflow pointer and node info entries) that help to manipulate the page data. Page data is composed of node data units in which each data unit describes a node of an XML document. The following terms are used in the table:

Page internal weight: The sum of the weights of all edges with both ends located in the page.

Page external weight: The sum of the weights of all edges from nodes in the current page to nodes on other pages.

The disk simulator is constructed so as to facilitate experimentation with iPIXSAR. To expedite the experiments, we keep the simulated disk data in main memory. We abstract out the physical characteristics of the disk (such as arm, platters, rotation, disk cache, etc.) by viewing it as an array of pages. While we lose precision using this simplification, the ranking of results does not significantly change based on a more detailed simulation.

The fact that the ranking remains true was observed experimentally for PIXSAR when using a physical disk.

File System Simulator

A simulator is used to trace disk accesses during run time. We use LRU as the page replacement method. As demanded by the iPIXSAR algorithm, a page may be pinned in main memory. Consequently, we use LRU with the following modifications. The page that is removed, in case a frame for a new page is needed, is the least recently used unpinned page. The removed page is written to disk only if it has been changed since the time it was read into memory.

TABLE 3

Page Directory

| Slot Name | Slot Description |
|---|---|
| The number of initial global counter | This counter holds the sum of the weights of all the augmented tree edges at the time of the last reclustering. |
| Initial internal counter | Holds the sum of the weights of internal page edges at the time of the last reclustering. |
| Initial external counter | Holds the sum of the weights of external page edges at the time of page creation. |
| Incremental internal counter | Holds the sum of weights that was added to the internal page edges during traversals over the page that have been performed since the last reclustering. |
| Incremental external counter | Similar to incremental internal counter. |

Saxon-Like XPath Processing

The Saxon-L (Saxon Like) simulator mimics the operations of the Saxon XPath query processor. The main difference between Saxon and Saxon-L is that Saxon stores XML information in relational tables, while Saxon-L uses native XML Storage. Saxon navigates the XML document using the following information:

1. The "next" column of the table ("next" contains the following sibling node and, in case there are no following sibling nodes, "next" returns the parent node).

2. IDs of the nodes which are processed in DFS (depth first search) order.

3. The "parent" column of the relational table.

Saxon-L is a hypothetical query processor for the system, which operates in a manner similar to that of Saxon. A log of nodes that are visited during the execution of the Saxon XPath processor, is created. Saxon-L (hypothetically) uses the Saxon traversal algorithm, and mimics the traversal carried out by Saxon. Consider, for example, traversing a child axis. Saxon performs the traverse by using the next column. It obtains the first child (the next node in DFS order) and then iterates over all the following sibling nodes. Saxon-L simply goes over all the children pointers that are located within the node record. This is why the log file, which tracks each time a node in the augmented tree is touched by Saxon, records an identical traversal order for both tools: the actual Saxon and the hypothetical Saxon-L. In other words, the recorded execution in the Saxon log is tantamount to the order the hypothetical Saxon-L would have produced.

Weight Updating Algorithm: During the traversal over the document tree, we need to update edge weights. An edge weight is a way to quantify the importance of placing two nodes on the same page on disk. The idea is that if two nodes are often temporally traversed close enough to each other, we would like them to be located in the same page. The meaning of "close enough" is as follows. Suppose a node $x_1$ is traversed and then, after traversing nodes $x_2$, $x_3$ to $x_{i-1}$, node $x_i$ is traversed. If nodes $x_1$, $x_2$ to $x_i$ are small enough to be placed in the same page, we say that $x_1$ and $x_i$ are close enough. If during the traversal two nodes are found to be close enough and there is an edge between them, this edge's value is incremented by one.

To save space, the augmented tree that is stored in disk is built in such a way that all its edges are unidirectional. This means that for edge (a, b), directed from a to b, there has to be a special treatment for the case that during the traversal, b is encountered before a. The temporal proximity algorithm copes with this minor complication.

Supporting indices: Indices contain index entries with direct pointers to target nodes that correspond to some XPath query expression. When a query expression whose prefix is an indexed expression is processed, no traversal is done for the indexed part of the expression—the query processor jumps directly to the nodes that are pointed by the index. Consequently, no weight is added to edges which are included in the path that is covered by the index. The (hypothetical) Saxon-L query processor (unlike Saxon) utilizes indices in XPath queries. We implement this feature by inserting a simple modification into the Saxon source code that enables marking the indexed part of the query execution.

During the processing of the query, the modified Saxon puts a special mark in the produced log, near the nodes that are part of the navigation covered by the index. Saxon-L identifies this mark, and does not read the corresponding nodes, and hence no page faults result for such nodes. This way we simulate direct jumps by Saxon-L, to indexed nodes.

The weight updating algorithm determines whether nodes are accessed in temporal proximity, in which case storing them on the same disk page is likely to reduce the number of page faults. Note that in case temporal proximity applies, but nodes are connected by neither child-parent edge nor by sibling edge, PIXSAR is unable to record this property. This situation occurs when using indices. In iPIXSAR, we adjust the temporal proximity algorithm, and iPIXSAR is able to identify subsequent index entries which are close enough.

Figure 8:
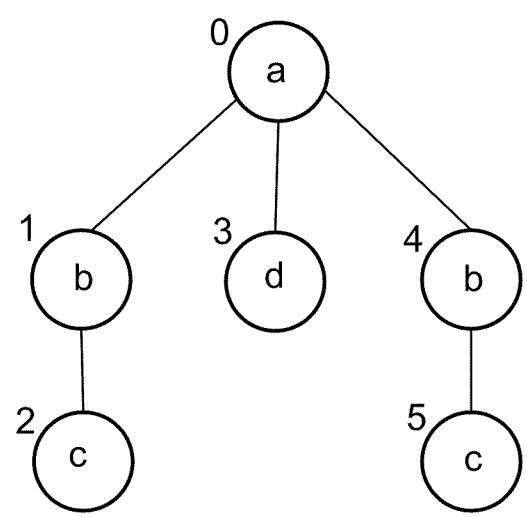
FIG. 8 is a simplified diagram showing a log and a corresponding tree structure according to an embodiment of the present invention.

FIG. 8 presents a simple example of a Saxon-L run. In the example we see a simple augmented document tree, and a log of the query /a/b'/c for this tree. The character ' denotes the last step of an indexed part, i.e., an index exists for /a/b. The first column of the document is the DFS ID of the touched node. The Second column indicates whether the current node is part of a path covered by an index. The order of traversal can be determined from the log, i.e., the DFS ID of the first node that is touched is "−1" (it is a dummy node that stands for the root of the augmented tree—parent of a), the next touched node has DFS id 0 (the id of the real root of the document—the node a), etc. Note that all the nodes that belong to the indexed part /a/b are marked with an asterisk *. When Saxon-L traverses the document according to this log, it does not read * marked nodes from disk. That is, no weight is added to edges (−1, 0), (0, 1), (0, 3) and (0, 4), because the nodes with DFS ID 0, 1, 3 and 4 are covered by the index expression /a/b. The weights of edges (1, 2), (4, 5) are incremented during the traversal.

Experimental Evaluation

In U.S. Provisional Patent Application No. 61/054,249, we compare PIXSAR to DFS, on a simulated and on a real physical disk. We find that PIXSAR results are better than DFS by 20% to 50% on a simulated disk and 60% better on a real disk. In this work, we compare iPIXSAR to PIXSAR.

Recall that, DFS is a depth-first scan and store scheme. DFS is a natural clustering algorithm that scans an XML document in a depth-first search manner and assigns every encountered node to the currently used disk page. As soon as the current page is full, DFS starts assigning nodes to a new page. A major advantage of DFS is that it places together XML nodes that are neighbors in the document.

Another advantage of DFS is that it is an online single-pass algorithm. DFS uses only parent-child edges, performs only a single initial clustering of the document, and then does not change the storage arrangement.

For experimental purposes, we write a simple XML document generator. We use this generator to create test cases with indices. All experiments run on a x86-based Linux machine with 3 GB main memory and 250 GB disk space.

We use the number of page faults and the final partition cut value (total of inter-page edge weights) as the main metrics of performance. We count all read-page-faults that occur during each run, including page faults that occur during the initial organization of the document, traversal and reclustering operations.

Main Parameters

To evaluate the performance of iPIXSAR, we experiment with document sizes of 10 MB and 124 MB.

The following parameters are set to fixed values (based on experimentation).

Cache size is set to 10% of document size in disk.

Reclustering page limit (a limit on the number of pages that can participate in a reclustering) is set to 1.5% of document size in pages (in our case, 55 pages).

Other parameters are set as follows:

Reclustering radius (RR)—2 and 3.

Reclustering factor (RF)—The magnitude of change required to edge weights in order to trigger reclustering. We use two different factors: 2% and 3% of change in the value of edge weights counters in the page.

Number of different indices (NOI)—1 and 2.

An additional important parameter is chunk size. Chunk size determines the weight interval used in the PIXSAR algorithm, which in turn invokes the XS algorithm. Chunk size affects both the total execution time and the partition quality (smaller chunk size results in a higher value, that is better, partition). The chunk size parameter is dominant for large files. iPIXSAR self-tunes the chunk size parameter as follows. If the number of pages participating in reclustering is small, then PIXSAR uses a small chunk size, but if the reclustering portion is large, PIXSAR uses a bigger chunk size.

Experimental Description

Setting Up

An experiment run has two input files: an XML document, and a log file with queries to be run on the given document. The structure of this log file is as follows. There is a core composed of different queries which are called the basic log workload. This basic log workload is repeated a number of times. This creates the experimental workload. By using a basic workload that is repeated, the structure of the log roughly models a real-life workload. An experiment begins with loading the input document to the simulated disk. We use the DFS algorithm for the initial data placement on disk.

Initially, every edge in the document has weight 1. All logs were recorded by running the following basic queries. PARAM represents a randomly chosen value (chosen individually per query occurrence). The relevant DTD, is given at the end of the description.

/collection/cake recipe/ingredient complex/ingredient/preparation/step PARAM/text( )
/collection/cake recipe/*[position( )=PARAM]/preparation/step 4/text( )
/collection/bread recipe/ingredient complex/ingredient/preparation/step PARAM/text( )
/collection/*[position( )PARAM]/nutrition/@fat
/collection/*/*[@unit='cup']/ingredient complex/*[position( )=PARAM]/preparation/step PARAM/text( )
/collection/meat recipe/ingredient complex/ingredient complex/preparation/step 6/text( )
/collection/meat recipe/ingredient complex/ingredient complex/ingredient complex/preparation/step 1/text( )
/collection/¯sh recipe/ingredient complex/ingredient complex/ingredient complex/@name
/collection/¯sh recipe/ingredient complex/ingredient complex/ingredient complex/*/preparation/comment/text( )
/collection/pie recipe/ingredient complex/ingredient complex/ingredient complex/ingredient complex/@name
/collection/icecream recipe/*/preparation/comment/text( )

Experiment Description

Every experiment has three main runs:

DFS Run—After loading the document to disk, it is traversed according to the queries log file. No changes are performed to the document placement on disk during this step. During the traversal the relevant information may be collected to result logs.

A PIXSAR Run—After loading the document to disk, we traverse the document according to the queries log file. During this traversal, we run the original incremental algorithm (PIXSAR), and collect the relevant information (number of page faults and partition values) to result logs. Page faults occurring while reclustering are also counted.

An iPIXSAR Run—After loading the document to disk, we traverse the document according to the queries log file. During this traversal, we run the new incremental algorithm (iPIXSAR), and (as in the PIXSAR run) collect the relevant information to result logs.

In order to easily comprehend the experimental results, we collect the relevant information 300 times during each run. We divide the traversal log into 300 equal parts, and at the end of each such part we log the relevant execution information. For example, if the log length is 30,000 then before starting traversing each sequence of 100 queries, we log information at this point.

Evaluation of iPIXSAR

Figure 9:
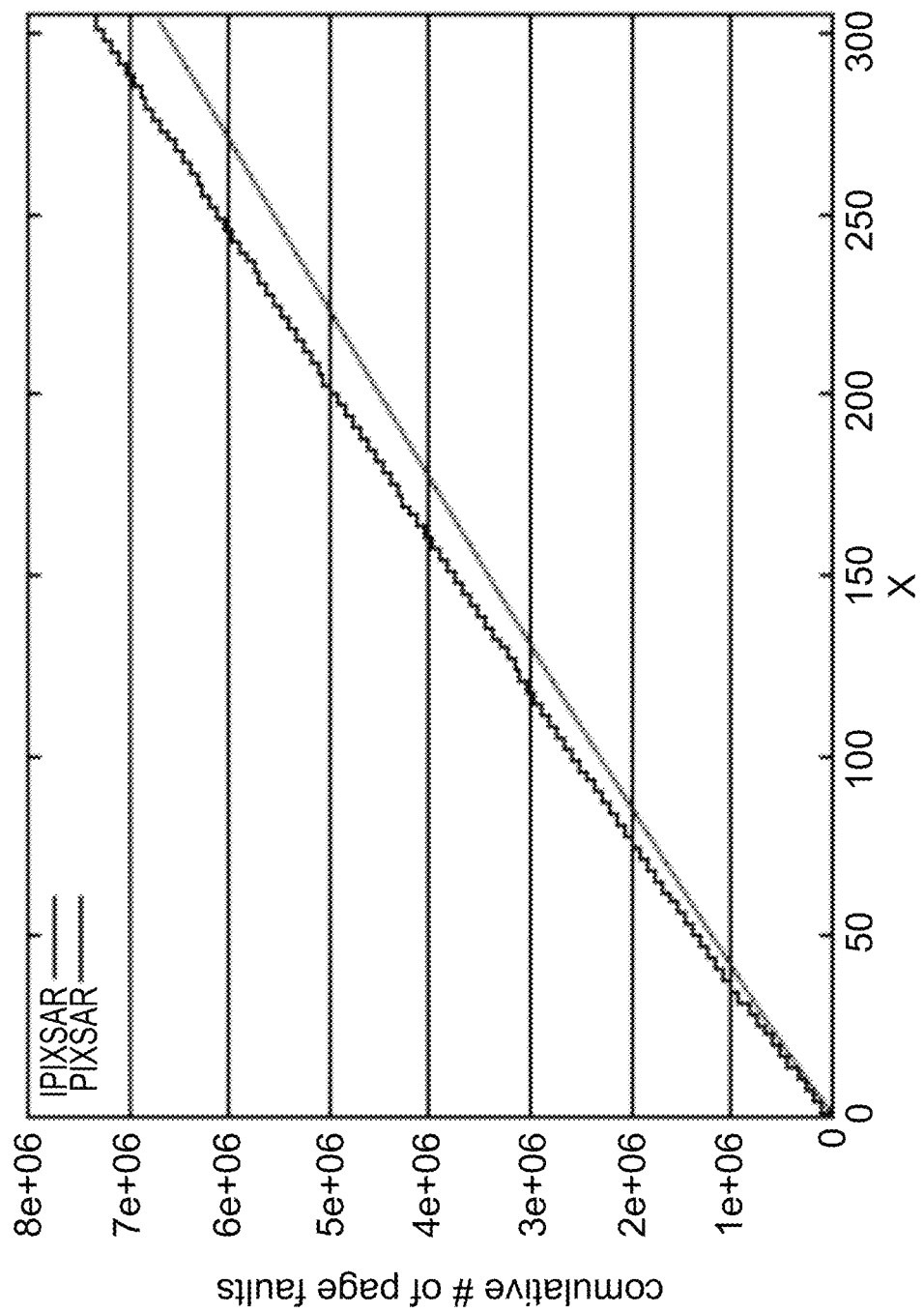
FIG. 9 is a graph showing comparative results between PIXSAR and iPIXSAR in terms of cumulative page faults.

In the first set of experiments, we used a 10 MB document. The queries log file was 160,000 queries length. The results are presented in Table 6 and in Table 4. The improvement of iPIXSAR over PIXSAR while experimenting with a simulated disk, varies between 3% to 8% (Table 5). The improvement of iPIXSAR over PIXSAR while experimenting with a real disk, varies about 10% for all the tests (Table 4). For Example, in an experiment with RR=3, RF=2 and NOI=3 iPIXSAR gives an improvement of 8.2% over PIXSAR. Another interesting result is an experiment with RR=3, RF=2 and NOI=3 (i.e., with 3 different indices), where the improvement of iPIXSAR over PIXSAR is 6.1%. In FIG. 9 we show the behavior of iPIXSAR in comparison to that of PIXSAR in terms of number of page faults. It shows the results of an experiment with RR=3, RF=2 and NOI=1. We observe that the slope of iPIXSAR grows slower than that of PIXSAR.

Also, in both graphs, starting from x=180, the slopes of both curves stabilize. This means that the number of page faults per unit time is fixed for the basic workload and is no longer being reduced by both algorithms. Intuitively, they have learned the workload.

In the second set of experiments, we used a 124 MB document. The results are presented in Table 6. The improvement of iPIXSAR over PIXSAR is less than 1%.

In a third set of experiments, evaluation of iPIXSAR was carried out using a real, that is a physical, disk. The series involved testing the performance of iPIXSAR by experimenting with a real physical disk having the following characteristics: capacity—500 GB, rotational speed: 7,200 rpm, cache—16 MB, interface—SATA II, max. external transfer rate—300 MB/s, seek time read—8.9 ms, seek time write: 10.9 ms, seek time track-to-track—2.0 ms, seek time full stroke (the amount of time to seek the entire width of the disk, from the innermost track to the outermost): 21.0 ms.

To get as close as possible to modeling a real world scenario, we used the following operational model. There are several users that concurrently use the disk, and some of them perform disk write operations. Specifically, every t units of time, on the average, a write operation is performed (t is parameter). Each experiment is characterized by the values of its parameters. In this set of experiments we work with a 10 MB document. The following parameters were set to fixed values (based on experimentation). Cache size was set to 10% of disk size. Reclustering page limit (a limit on the number of pages that can participate in a reclustering) was set to 1.5% of document size. Reclustering radius was chosen randomly (2 or 3). Reclustering factor was set to 3%. Disturbance Time (DT) is the percentage of write operations performed to a random location in the disk. For example, DT=0.5, means that 0.5% of the read operations, on average, are followed by a write operation to a randomly chosen location in the disk. DT was set to 0.66%. Edge up-date frequency was set to 5%. Edge up frequency is the percentage of updating the edge weights of the algorithm. Edge weights are updated probabilistically, e.g., every n'th update on the average for a parameter n, rather than upon each and every change. Other parameters were set as follows:

²Number of queries in the queries log file (NOQ)—200,000, and 320,000.

²Number OF Indices (NOI)—1 and 2.

The results of the physical disk experiments are presented in Table 4.

TABLE 4

Results for a 10 MB document, experiment performed with a physical disk.

| Experiment Parameters | PF Impr(%) | Query time Impr(%) | Total time Impr(%) |
|---|---|---|---|
| NOI = 1, NOQ = 320,000 | 7.5 | 9.5 | 9.5 |
| NOI = 1, NOQ = 200,000 | 8 | 9 | 9 |
| NOI = 2, NOQ = 200,000 | 5 | 6 | 6 |
| NOI = 2, NOQ = 200,000, randomal | 6 | 10.5 | 10.5 |

Improvements shown are percentage improvements of an iPIXSAR run over a PIXSAR run. PF indicates page faults.

Four experiments were performed. The first and the second experiment check the case of a single index. The first experiment was run for 320,000 queries, and the second one was run for 200,000 queries. Observe that the results are identical. It means that the length of the run has no influence on the quality of the results. The last two experiments were run with two indices. The third experiment selected the reclustering tree out of three possible trees: the base augmented tree and two index augmented trees. The last experiment selected the reclustering tree from two trees. These two trees were chosen randomly from three possible trees. We can see that eliminating randomly one of the trees, improve the results significantly.

The average improvement. of iPIXSAR in comparison with PIXSAR is about 10%, which is a significant improvement.

The 10 MB experiments with query file length of 160,000, with a single index give roughly an 8% improvement, which is significant. With two indices, the improvement is about 4%. With three indices, the improvement is about 2.5%. We note that in one of the experiments with three indices the improvement is 6.1%. It is also possible that with multi-indexes it takes longer to see the reclustering effects, and intuitively, it may take longer to learn a more complex behavior. The 124 MB experiments do not reveal such a large improvement.

Indices do influence the effectiveness of storage. Since the same machinery is used for storage rearrangement with and without indices, it is apparent that there is a to need to recluster while taking indices into account.

TABLE 5

Results for a 10 MB document.

| Experiment Parameters | DFS PF | PIXSAR PF | iPIXSAR PF | Impr 1 (%) | Impr 2 (%) |
|---|---|---|---|---|---|
| NOI = 1, RR = 2, RF = 2 | 34,911,033 | 28,094,417 | 26,169,319 | 20 | 6.9 |
| NOI = 1, RR = 2, RF = 3 | 34,911,033 | 28,393,899 | 26,270,965 | 19 | 7.4 |
| NOI = 1, RR = 3, RF = 2 | 34,911,033 | 28,247,853 | 25,033,148 | 19 | 8.2 |
| NOI = 1, RR = 3, RF = 3 | 34,911,033 | 28,286,191 | 26,282,519 | 19 | 7.1 |
| NOI = 2, RR = 2, RF = 2 | 39,385,785 | 33,443,175 | 32,338,100 | 15 | 3.3 |
| NOI = 2, RR = 2, RF = 3 | 39,385,785 | 33,308,135 | 32,789,606 | 15 | 1.6 |
| NOI = 2, RR = 3, RF = 2 | 39,385,785 | 32,703,068 | 31,445,995 | 17 | 3.8 |
| NOI = 2, RR = 3, RF = 3 | 39,385,785 | 32,714,216 | 31,584,575 | 17 | 3.5 |
| NOI = 3, RR = 2, RF = 2 | 43203016 | 35,154,715 | 34,302,104 | 19 | 2.4 |
| NOI = 3, RR = 2, RF = 3 | 43203016 | 35,866,092 | 34,865,094 | 17 | 2.7 |
| NOI = 3, RR = 3, RF = 2 | 43203016 | 35,236,096 | 33,066,640 | 18 | 6.1 |
| NOI = 3, RR = 3, RF = 3 | 43203016 | 33,908,089 | 33,290,717 | 22 | 1.8 |

PF columns show number of page faults. The Impr 1 column show percentage improvement of a PIXSAR run in comparison to a DFS run. The Impr 2 column show percentage improvement of an iPIXSAR run in comparison to a PIXSAR run.

TABLE 6

Results for a 124 MB document.

| Experiment Parameters | PIXSAR Page Faults | iPIXSAR Page Faults | Impr (%) |
|---|---|---|---|
| NOI = 1, RR = 2, RF = 3 | 187292797 | 186521871 | 0.5 |
| NOI = 1, RR = 3, RF = 3 | 186337887 | 186083157 | 0.2 |

The Impr columns show percentage improvement of an iPIXSAR run in comparison to a PIXSAR run.

Two Levels Mass Memory

In the above we have considered a model that has only one level of mass storage memory. Here we consider a model that has two mass memory levels. In this model, the first mass memory level is fast but of limited capacity. The second level has practically unlimited capacity, but the streaming to and from the second level can be expensive in terms of both time and money.

There are two main concerns about two memory levels. The first concern is making sure that the most relevant data is placed in the first memory level, which is faster, whereas all other data (assumed less relevant) is held in the second memory level. The second concern is organizing the information in both levels so as to save on access time (and cost).

Figure 10:
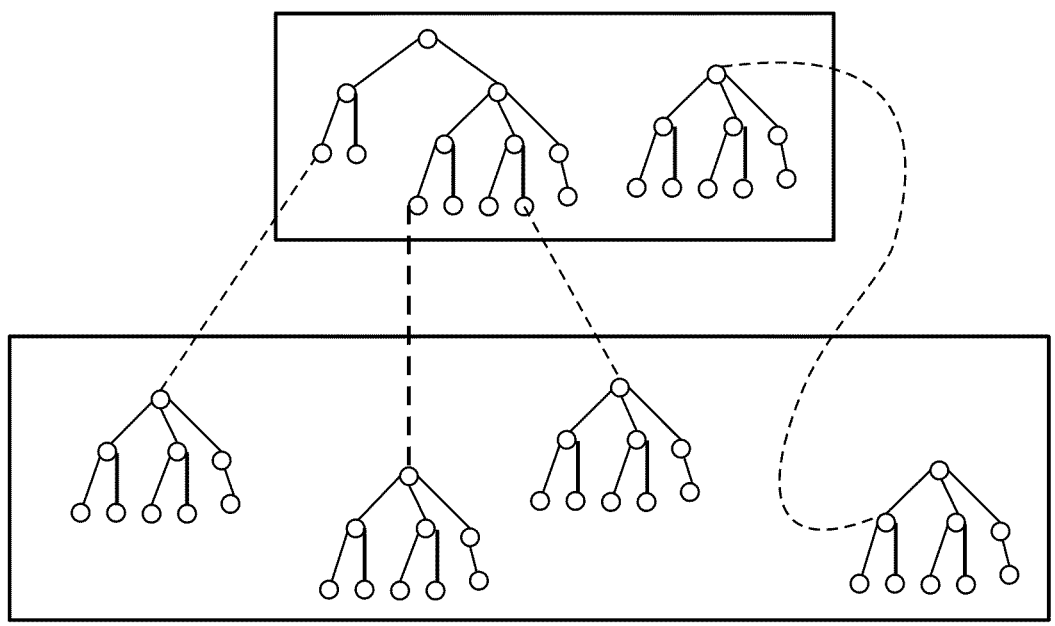
FIG. 10 is a graph showing data arranged as a tree and split between first and second memory levels.

We view all the stored information as one "big tree", where some subtrees are located in the first memory level and the other parts of the tree are in the second memory level. Reference is now made to FIG. 10 which shows a single tree divided into two levels 100 and 102. Certain nodes with daughter and granddaughter nodes are at one level and other nodes are at the other level. Dotted lines indicate connections between nodes at the different levels.

We present models that capture the essence of two mass memory levels. In these models, the first memory level is a disk (or collection of disks), whereas the second memory level is a remote storage facility. The models are characterized along three axes:

1. Storage mode on the second memory level. We differentiate between:
   BOM (Block Object Model): The size of each entity that is stored in the second memory level is one page.
   FOM (File Object Model): Each object that is stored in the second memory level is a file of arbitrary size. Each file may hold many pages.
   An advantage of FOM is to reduce the number of requests that are needed in order to read large amounts of data. A disadvantage of FOM is that in a case of needing only one page, we must read the whole file, which can be a costly operation.

2. Movement of data to/from the first level from/to the second level. In the models we consider this capability is essential and is motivated by a desire to store the most frequently used data in the first level.

3. Movement of data within pages of a certain level. In the models we consider, this capability is always available in the first level. This capability may or may not be available in the second level.

The third axis, movement of data within pages of a level, may be exceedingly expensive for slow devices. It may also be very expensive in certain settings. For example, consider the Amazon S3 system. Amazon S3 (Simple Storage Service) is an online storage web service, that provides practically unlimited storage. The usage of S3 is not free of charge. Transferring 1 GB into S3 costs $0.1, and from S3 $0.17. Storage of 1 GB costs $0.15 per month. Each S3 request is also charged, the amount depends on the type of the request. One more characteristic of S3 is that the user can not directly change a stored data unit. The only way to change a stored data unit is to read it completely to main memory and to update it there, then to store the updated data unit once again to Amazon S3. So, one can conceivably perform movement of data within pages, by reading them into main memory, or the first level memory, performing the reorganization and then storing back to the second memory level.

We consider a setting similar to Amazon S3, in which BOM (axis 1), movement of data to/from the first level from/to the second (axis 2) is enabled, and movement of data among pages of the second level is not allowed (axis 3). Next, we describe the Two Memory Levels algorithm. The goal of this algorithm is to decide which data is the most relevant at each moment (accessed frequently), and to perform all the needed operations that are required to keep such data in the first memory level.

Figure 11:
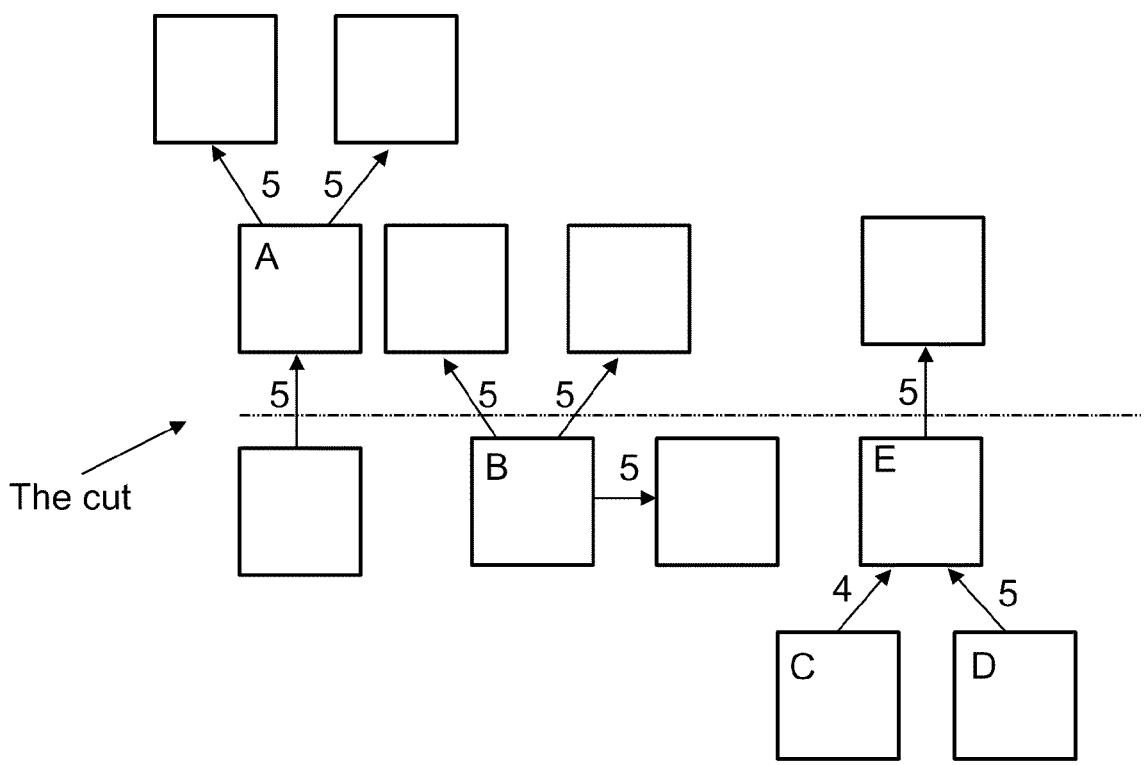
FIG. 11 is a graph showing a cut being made between nodes assigned to one memory level and nodes assigned to another, according to embodiments of the present invention.

We define:
The cut is the set of edges such that for each edge, one node is placed in the first memory level whereas the second node is placed in the second memory level. A cut is illustrated in FIG. 11.
A page is said to be above (or correspondingly below) the cut, if it resides in the first level memory but contains an element that is connected via an edge to an element in a page in the second (or correspondingly first) level memory.

The value of the cut is said to be the sum of weights of all edges in the cut.

The Two Memory Levels algorithm treats pages. The basic idea underlying this algorithm is to check, once in a while, the edges in the cut. When an edge with a relatively high weight is found, conceptually, the algorithm examines all the edges in the cut. It looks for a new placement that will keep the value of the cut as small as possible. In practice, this examination need be made for only a subset of the edges on the cut or may be done incrementally to all edges in the cut.

Consider a data tree that is navigated without indexes. An edge that is closer to the tree root usually has a weight that is bigger than or equal to the weight of all its descendant edges. The reason is that nodes that are closer to the tree root are visited more often than nodes that are farther away from the root. So, intuitively, the value of the cut roughly measures the number of times we cross the cut and access the second level. We would therefore strive to keep this value as small as possible. Of course, with indexes, the situation is more complex.

Next, we present a greedy algorithm that attempts to minimize the cut value. The heuristic of keeping the cut minimal as well as the greedy heuristic still needs to be verified experimentally.

The algorithm uses an (m×n) array (cutWeightsArray). Denote the edges which are above the cut as $(a1; a2; \ldots; am)$, and those below the cut as $(b1; b2; \ldots; bn)$. The first (or correspondingly the second) dimension of cutWeightsArray refers to the ai's (respectively, bi's). Each element $(i; j)$ of cutWeightsArray is the new value of the cut in case of an exchange in which we move page ai to the second memory level and page bj to the first memory level.

The algorithm is presented in Table 7. The function toMove (e) in line 1 triggers the algorithm, it checks if an edge weight is significantly changed, relative to all other tree edges. The function calcNewCutValue(i; j) in line 2.1.2 calculates the new value of the cut in case we move page ai to the second level and page bj to the first level.

movedUpperPages (or correspondingly, movedLowerPages) in line 2.2 (or correspondingly 2.3) holds indices of pages from above (correspondingly below) the cut that were already moved below (correspondingly above) the cut. These pages should no longer be considered for further exchange. The function findMinValueIndices(cutWeightArray;MUP; MLP) in line 2.5.1, finds the indices (l;m) of the minimal element in the cutWeightArray, such that page al was not already moved to the second level and page bm was not moved to the first level. 'k', a system parameter, in line 2.4 is the number of exchanges, between a page from above the cut and a page from below the cut, to be performed at each activation of the algorithm. The function movePageBelow(p) (respectively, movePageAbove(p)) in line 2.5.2 (correspondingly, 2.5.3) moves page p from above (correspondingly below) to below (correspondingly above) the cut. In line 2.5.4 (or correspondingly, 2.5.5), we add l (correspondingly, m), the index of page al (correspondingly, bm), to movedUpperPages (correspondingly, movedLowerPages) as it was already moved below (correspondingly above) the cut.

The function fixCutWeightArray(l;m) in line 2.5.6, fixes line l and column m in cutWeightArray, as it was changed due to the exchange between page al (from above the cut) and page bm (from below the cut).

TABLE 7

The Two Memory Levels Algorithm

For a checked edge e in the cut:
1. if (toMove(e)) /*the weight of e has changed significantly so rearrangement of the cut is needed*/
   2.1 for(i = 1;i ≤ m;i ++)
      2.1.1 for(j = 1;j ≤ n;j ++)
         2.1.2 cutWeightArray[i, j] = calcNewCutValue(i, j)
   2.2 movedUpperPages.clear( )
   2.3 movedLowerPages.clear( )
   2.4 for(i = 0; i ≤ k; i ++)
      2.5.1 (l, m) = findMinValueIndices(cutWeightArray, movedUpperPages, movedLowerPages)
      2.5.2 movePageBelow(l)
      2.5.3 movePageAbove(m)
      2.5.4 movedUpperPages.add(l)
      2.5.5 movedLowerPages.add(m)
      2.5.6 fixCutWeightArray(l, m)

General

In the above we present iPIXAR, a directed algorithm for incrementally adjusting XML document placement on disk while taking indices into account. In this framework, node weights express storage requirements and edge weights represent the likelihood of co-residing in cache. The problem as a whole is cast as an augmented (with sibling edges) tree partitioning problem which takes into account indexed nodes. iPIXSAR is able to express affinity between indexed nodes which are not connected via structural edges.

Thus the dynamic partitioning is extended to the Multi Rooted Tree. Practically, we can see each index as an additional root to some subtrees of the basic tree. There is no known $O(nP^{*k})$ precise partitioning algorithm for this problem. This problem is non trivial and is a promising future work direction.

We construct an experimental data clustering system that includes a disk and File System simulator for storing native XML data. We also devise efficient methods for recording access patterns, express them as edge weights, and efficiently trigger when the file organization becomes deficient. That is, the iPIXSAR can be used with varying parameters, which influence memory and runtime costs on the one hand, and the quality of data placement which affects the amount of page faults, on the other hand.

Previous experience demonstrates, that experiments with a real (physical) disk give much better results than experiments on a simulated disk.

TABLE 8

Recipes Data Used in the Experiment
A. XML GENERATOR DTD
The following is a table of the recipes data used in the experiments:

```
<!-- DTD for recipies database -->
<!ELEMENT collection (description, (meat_recipe | cake_recipe |
pie_recipe | fish_recipe | bread_recipe|
icecream_recipe)*)>
<!ELEMENT description ANY>
<!ELEMENT meat_recipe (title,(ingredient_complex | ingredient)*,
preparation,comment?,nutrition)>
<!ELEMENT cake_recipe (title,(ingredient_complex | ingredient)*,
preparation,comment?,nutrition)>
<!ELEMENT pie_recipe (title,(ingredient_complex | ingredient)*,
preparation,comment?,nutrition)>
<!ELEMENT bread_recipe (title,(ingredient_complex | ingredient)*,
preparation,comment?,nutrition)>
<!ELEMENT fish_recipe (title,(ingredient_complex | ingredient)*,
preparation,comment?,nutrition)>
<!ELEMENT icecream_recipe (title,(ingredient_complex | ingredient)*,
preparation,comment?,nutrition)>
```

TABLE 8-continued

Recipes Data Used in the Experiment
A. XML GENERATOR DTD
The following is a table of the recipes data used in the experiments:

```
<!ELEMENT title (#PCDATA)>
<!ELEMENT ingredient (preparation)?>
<!ATTLIST ingredient name CDATA #REQUIRED
amount CDATA #IMPLIED
unit CDATA #IMPLIED>
<!ELEMENT ingredient_complex ((ingredient_complex | ingredient)*,
preparation?)>
<!ATTLIST ingredient_complex name CDATA #REQUIRED
amount CDATA #IMPLIED
unit CDATA #IMPLIED>
<!ELEMENT preparation ((step_(1|2|3|4|5|6|7))*, comment?)>
<!ELEMENT step_1 (#PCDATA)>
<!ELEMENT step_2 (#PCDATA)>
<!ELEMENT step_3 (#PCDATA)>
<!ELEMENT step_4 (#PCDATA)>
<!ELEMENT step_5 (#PCDATA)>
<!ELEMENT step_6 (#PCDATA)>
<!ELEMENT step_7 (#PCDATA)>
<!ELEMENT comment (#PCDATA)>
<!ELEMENT nutrition EMPTY>
<!ATTLIST nutrition protein CDATA #REQUIRED
carbohydrates CDATA #REQUIRED
fat CDATA #REQUIRED
calories CDATA #REQUIRED
alcohol CDATA #IMPLIED>
```

Reference is now made to FIG. 12, which illustrates an example of a full index structure prior to fixing, according to an embodiment of the present invention which was discussed above in respect of FIG. 2. In the figure, the index is //a. Ind1 is a dummy node which is the root of the index structure. Arrows 50-53 extend from the root to its children, the children being all the 'a' labeled tree nodes, and sibling edges extend between the corresponding 'a' labeled tree nodes. In particular arrow 52 extends from the root to the contained subtree, and arrow 53 extends from the root of the containing subtree to the root of the contained subtree.

FIG. 13 shows in detail a case of overlapping or implied sub trees of the index structure of FIG. 12. In the present example one subtree includes within it another subtree, specifically subtree 2 contains a version of subtree 1 which is labeled as subtree 3.

FIG. 14 shows the index augmented tree of FIG. 12 after fixing the initial index structure. Specifically two edges have been deleted—edge 52, which is the edge from the index root to the "contained" subtree and edge 53, from the "contained" subtree to its left sibling which is also the subtree containing it. Edges 50 and 51 remain.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. In a data storage and retrieval system wherein data is stored and retrieved in pages, said data comprising connected nodes arranged such that each page stores only complete nodes, said connected nodes being connected via a plurality of overlapping tree structures, each of said overlapping tree structures comprising a respective root node, a method of minimizing page retrieval in the face of changing relationships between nodes comprising:

selecting at least two of said overlapping tree structures having a respective root node;

incrementally adjusting the association of nodes to pages dynamically based on data requests of a workload, separately according to each selected tree structure and respective root node, to form modified pages for each tree structure, each modified paging partition being so as to reduce expected page faults;

for each tree structure and associated modified paging partition calculating a modification gain to indicate which partition has provided a greater expected reduction of page faults; and selecting the tree structure and modified partition corresponding to a largest of said modification gains for continued data retrieval and for continued dynamic modification of said page node structure within said data storage and retrieval system.

2. The method of claim 1, wherein an index comprises the following structure:

a dummy node forming a root of the structure;

child nodes of the root, providing index target nodes;

edges extending between respective pairs of said child nodes; wherein each index target node is pointed by an index entry, and wherein each index target node further comprises a root of a subtree, such that any one subtree may be contained wholly within another.

3. The method of claim 1, wherein the data is XML and at least one of said overlapping trees comprises an index of entries pointing to XML target nodes.

4. The method of claim 3, wherein each index entry points to an index target node which is the root of an XML sub-tree.

5. The method of claim 3, wherein said selecting comprises making a storage decision for respective ones of said XML Index trees based on membership of said nodes in more than one tree.

6. The method of claim 1, wherein said nodes are connected by edges, each edge being dynamically assigned a weighting based on whether said corresponding nodes are retrieved in temporal proximity, said modification gain comprising an increase in relative weightings of pages brought about by said modification.

7. The method of claim 1, wherein said selecting at least two of said overlapping tree structures comprises making a randomized selection from among a plurality of trees.

8. The method of claim 1, wherein the data of an XML node spans more than one disk page, the method further comprising translating to a view where all the data nodes are no bigger than a size of a page.

9. A data storage and retrieval system wherein data is stored and retrieved in pages, said data comprising connected nodes arranged such that each page stores only complete nodes, said connected nodes being connected via a plurality of overlapping tree structures, each of said overlapping tree structures having a respective root node, the system implemented on one or more electronic processors and comprising:

a test tree selector unit for selecting at least two of said overlapping tree structures with corresponding respective root nodes;

a dynamic page structure modification unit for incrementally adjusting a page node structure dynamically based on data requests of a workload, said adjusting being carried out separately for respective tree structures and respective root notes selected by said tree selector unit, and for each selection forming modified page partitions for each tree structure, each modified page partition being so as to reduce expected page faults; and a partition selector unit for calculating a modification gain for each selected tree to indicate which page partition modification has provided a greater expected reduction of page faults and selecting the tree structure and modified page partition corresponding to a largest of said modification gains for continued data retrieval and modification of said node structure within said data storage and retrieval system, thereby reducing page faults in the face of changing relationships between nodes.

10. The system of claim 9, wherein an index comprises the following structure:

a dummy node forming a root of the structure;

child nodes of the root, providing index target nodes;

edges extending between respective pairs of said child nodes; wherein each index target node is pointed by an index entry, and wherein each index target node further comprises a root of a subtree, such that any one subtree may be contained wholly within another.

11. The system of claim 10, wherein at least one of said overlapping trees is created from said index structure by removing two edges from the index structure.

12. The system of claim 9, wherein the data is XML and at least one of said overlapping trees comprises an index of entries pointing to XML target nodes which in turn are roots of XML sub-trees.

13. The system of claim 12, wherein the index structure contains overlapping subtrees, wherein the index structure is transformed to an index augmented tree by removing two edges from the Index structure, the removed edges being: an edge between the index root and a first subtree that is contained in another subtree, and the edge between the root of the contained subtree and the root of a second, containing, sub-tree.

14. The system of claim 13, wherein said partition selector unit is configured to make a storage decision for respective ones of said XML target nodes and associated sub-trees by assigning nodes to pages based on selection of one of said overlapping trees to which said target nodes belong.

15. The system of claim 9, wherein said nodes are connected by edges, each edge being dynamically assigned a weighting based on whether said corresponding nodes are retrieved in temporal proximity, said modification gain comprising an increase in relative weightings of pages brought about by said modification.

16. The system of claim 9, wherein said test tree selector unit is configured to select randomly from amongst said overlapping tree structures.

17. In a two level data storage and retrieval system having a first level of relatively fast storage and retrieval and a second level of relatively slow storage and retrieval, wherein data is arranged as an overlapping tree structure of nodes including respective root nodes and edges, each edge defining a relationship between two nodes in said tree, a method comprising:

monitoring ongoing data retrieval to find retrieval patterns of nodes which are retrieved in temporal proximity and to identify changes in said retrieval patterns over time;

recording said retrieval patterns as weightings to respective edges, and periodically and incrementally rearranging the data nodes among said storage levels dynamically during usage of the data to reflect said changes, separately according to respective selected tree structures and respective root nodes, so that a summation of edges between said first and second storage level is kept small, thereby to keep small an overall expected number of crossings to said second level from said first level during data retrieval despite dynamic changes in patterns of data retrieval, for continued dynamic modification of said page node structure within said data storage and retrieval system.

18. The method of claim 17, wherein said recording said retrieval patterns comprises incrementing weightings of a given edge when respective nodes are retrieved together within said temporal proximity.

19. The method of claim 17, wherein said periodically rearranging is triggered at a preset interval.

20. The method of claim 17, wherein said respective edges comprise parent-child edges between nodes in succeeding layers of said tree.

21. The method of claim 17, wherein said respective edges comprise sibling edges between nodes in a same layer of said tree.

22. The method of claim 17, wherein said keeping said summation of edges weights small is carried out by repeated minimization using a greedy algorithm.

23. The method of claim 17, wherein said data arranged in nodes comprises an XML file arranged as a tree with an XML root being the tree root and further comprising edges between adjacent sibling nodes.

24. In a data storage and retrieval system wherein data is stored and retrieved from a hardware memory in pages, said data comprising connected nodes arranged such that each page stores only complete nodes, said connected nodes being connected via a plurality of overlapping tree structures, each overlapping tree structure comprising a respective root node, a method of minimizing page retrieval in the face of changing relationships between nodes comprising:

randomly selecting one of said overlapping tree structures having a respective root node;

retrieving data in pages according to received requests of a workload, each page containing nodes associated according to said selected overlapping tree structure; and incrementally adjusting the association of nodes to pages dynamically based on said workload, separately according to each selected tree structure and respective root node, to form modified pages for said selected tree structure, each modified page being so as to reduce expected page faults, thereby retrieving data according to a randomly selected and dynamically updated tree structure of nodes in pages, for continued dynamic modification of said page node structure within said data storage and retrieval system.

* * * * *